United States Patent
Nakashita et al.

(10) Patent No.: US 7,157,917 B2
(45) Date of Patent: Jan. 2, 2007

(54) SENSOR CABLE HAVING EASILY CHANGEABLE ENTIRE LENGTH AND ALLOWING ACCURATE AND HIGH SPEED SIGNAL TRANSMISSION EVEN WHEN ENTIRE LENGTH IS MADE LONGER, AND AMPLIFIER-SEPARATED TYPE SENSOR WITH THE CABLE

(75) Inventors: Naoya Nakashita, Ayabe (JP); Hirotaka Nakashima, Fukuchiyama (JP); Hitoshi Oba, Fukuchiyama (JP); Masahiro Kawachi, Kyotanabe (JP); Kizuku Fujita, Ayabe (JP); Kohei Tomita, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 11/093,049

(22) Filed: Mar. 30, 2005

(65) Prior Publication Data

US 2005/0237068 A1    Oct. 27, 2005

(30) Foreign Application Priority Data

Mar. 31, 2004  (JP)  .............................. 2004-101911
Jul. 26, 2004   (JP)  .............................. 2004-218005

(51) Int. Cl.
*G01R 31/04* (2006.01)
(52) U.S. Cl. ........................ 324/538; 324/539
(58) Field of Classification Search ................ 324/538, 324/539
See application file for complete search history.

(56) References Cited

U.S. PATENT DOCUMENTS

| 6,088,271 | A * | 7/2000 | Wagatsuma ............ 365/189.05 |
| 6,411,108 | B1 * | 6/2002 | Douglas et al. ............. 324/658 |
| 6,492,650 | B1 * | 12/2002 | Imai et al. .................. 250/551 |
| 6,617,939 | B1 * | 9/2003 | Vermeersch .............. 333/28 R |
| 6,692,311 | B1 * | 2/2004 | Kamei et al. ................ 439/716 |
| 6,974,911 | B1 * | 12/2005 | Hyde ........................ 174/74 R |
| 2002/0131122 | A1 * | 9/2002 | Anderl et al. ................ 359/152 |
| 2005/0222693 | A1 * | 10/2005 | Inoue et al. .................. 700/28 |

FOREIGN PATENT DOCUMENTS

JP    2003-075117 A    3/2003

\* cited by examiner

*Primary Examiner*—Anjan Deb
*Assistant Examiner*—John Zhu
(74) *Attorney, Agent, or Firm*—Foley & Lardner LLP

(57) ABSTRACT

A cable includes a first connector half holding a conductor terminal, a second connector half holding a conductor terminal, an electric cord electrically connecting the conductor terminal of the first connector half to the conductor terminal of the second connector half, and a waveform shaping circuit performing waveform shaping of a signal passing through the electric cord, and the first and second connector halves are structured to allow attachment to and detachment from each other.

10 Claims, 22 Drawing Sheets

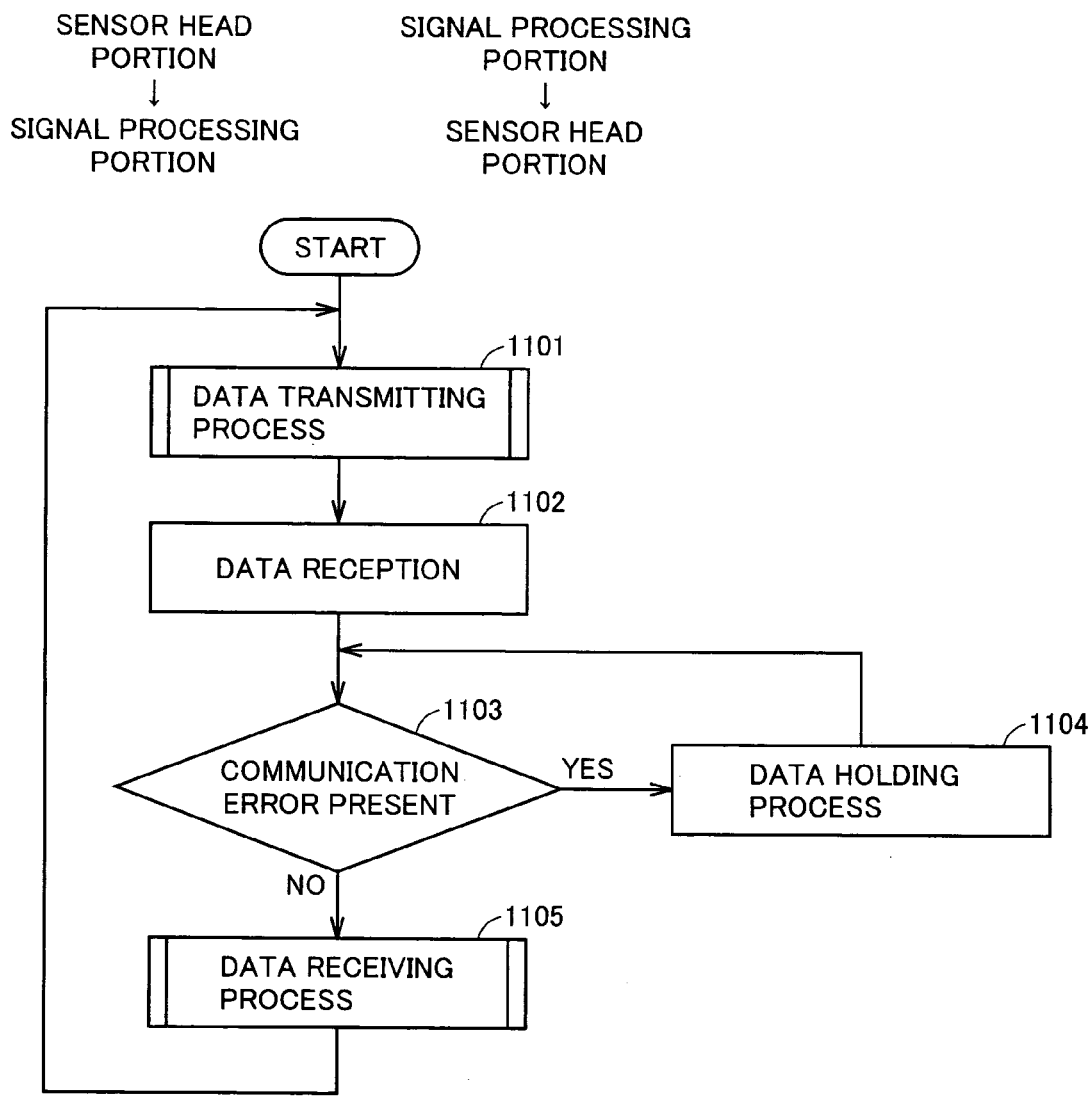

SENSOR CABLE HAVING EASILY CHANGEABLE ENTIRE LENGTH AND ALLOWING ACCURATE AND HIGH SPEED SIGNAL TRANSMISSION EVEN WHEN ENTIRE LENGTH IS MADE LONGER, AND AMPLIFIER-SEPARATED TYPE SENSOR WITH THE CABLE

BACKGROUND OF THE INVENTION

FIELD OF THE INVENTION

The present invention relates to a sensor cable for connecting a sensor head portion to a signal processing portion of an amplifier-separated type sensor. Specifically, the present invention relates to a sensor cable of which entire length can easily be changed as it is configured to allow coupling and integration of a plurality of cables and which allows accurate and high speed signal transmission even when the entire length is made longer, as well as to an amplifier-separated type sensor provided with the cable.

As a so-called "sensor", various and many sensors having different principles of operation have been known, including a displacement sensor, a visual sensor, a micro-wave sensor, an end-measuring sensor and the like. Even sensors of the same operation principle have wide variations (specifications).

Along with recent technical development, such sensors come to be used for various objects in various different manners. Accordingly, various and many functions and performances of the sensors come to be required by the user. In view of such market demands, most sensor manufacturers introduced a so-called large-item, small-volume production system. The large-item, small-volume production system is advantageous in that it can meet the different needs of different users, while it is disadvantageous in that the number of components increases and the cost increases accordingly as compared with the conventional small-item, large volume production system and that component management is troublesome.

In view of the foregoing, Japanese Patent Laying-Open No. 2003-75117 discloses an amplifier-separated type sensor, in which the sensor is separated into a sensor head portion including a detecting end (for a photoelectric sensor, a light emitting and receiving element, for a proximity sensor, a detection coil, and so forth) and a signal processing portion supplying electric power to the sensor head portion and processing signals obtained from the sensor head portion, and these portions are connected by a sensor cable, so as to facilitate preparation of sensor head portions corresponding to a plurality of different types, while a common signal processing portion may be used.

Further, based on the concept of the amplifier-separated type sensor, the applicant of the present invention has proposed a technique, according to which a plurality of different types of sensor head portions prepared assuming a plurality of different types of sensors, and a plurality of different types of signal processing portions formed in accordance with the control specification for prescribed sensor head portions respectively, are appropriately combined (connected) by a connector cable common to all the types, which technique allows appropriate manufacturing of sensors of different operation principles or specification. For this sensor, the signal processing portion can be manufactured by the conventional small-item, large volume production system, and therefore, while the sensor as whole is manufactured by large-item, small volume production system, the cost can be suppressed.

After the development of the amplifier-separated type sensor, the applicant continuously made improvements in view of market needs. One particular aspect of improvement is to increase the speed of signal transmission between the sensor head portion and the signal processing portion. As the sensor comes to have higher functions, it becomes necessary to increase the capacity for the sensing signals transmitted from the sensor head portion to the signal processing portion and control signals transmitted from the signal processing portion to the sensor head portion. Therefore, in order to maintain satisfactory speed of response, the signal transmission rate must be higher.

Particularly, for a displacement sensor employing a two-dimensional image pick-up device that has become dominant among measurement sensors, higher speed is essential. As a two-dimensional image pick-up device, CCD type or CMOS type device has been known. The amount of data output from either of these devices is so large that it cannot be compared with the data output from a general purpose photoelectric sensor that simply generates an ON/OFF output.

Increase in the signal transmission rate through the cable means higher frequency. As is well known, when the frequency becomes higher, noise influence becomes severer. Further, influence of capacity or resistance of the transmission path on the waveform is not negligible. Thus, transmission rate or transmission distance is limited. Therefore, as short as possible cable length is desired. In the actual site of use, however, it is often the case that the signal processing portion and the sensor head portion must be placed away from each other by a considerable distance (for example, about 50 m). In such a case, conventionally, a repeater driven by an external power source is provided in the middle of the cable. The repeater, however, cannot always be provided because of space limitations, such as when the sensor head portion is to be mounted on a movable portion. Further, handling of a power cord for the repeater has been troublesome.

SUMMARY OF THE INVENTION

The present invention was made in view of the problems described above, and an object of the present invention is to provide a sensor cable connecting a sensor head portion to a signal processing portion of an amplifier-separated type sensor, whose entire length can easily be made longer by coupling and integrating an appropriate number of cables when sensing signals or control signals of large capacity are to be transmitted, and which eliminates the necessity of arranging a separate repeater in the middle.

Another object of the present invention is to provide an amplifier-separated type sensor having a sensor cable coupling a sensor head portion to a signal processing portion, of which entire length can easily be made longer, and allowing stable high speed signal transmission even when the entire length of the cable is made longer.

Other objects, functions and effects of the present invention will be readily understood by a person skilled in the art from the following description of the specification.

The present invention provides a sensor cable for connecting a sensor head portion and a signal processing portion of an amplifier-separated type sensor. The sensor cable includes a first connector half holding a conductor terminal, a second connector half holding a conductor terminal, an electric cord electrically connecting the conductor terminal of the first connector half to the conductor terminal of the second connector half, and a waveform shaping circuit performing waveform shaping on a signal passed through the electric cord. The first connector half and the second connector half have such structures that allow attachment to and detachment from each other, whereby a plurality of said sensor cables can be coupled and integrated for signal transmission.

The electric cord includes at least a communication line for transmitting a sensing signal output from the sensor head portion to the signal processing portion. When drive control of the sensor head portion is done by the signal processing portion, a second communication line is further included, for transmitting a control signal output from the signal processing portion to the sensor head portion.

In the sensor cable of the present invention described above, an appropriate number of cables may be coupled and integrated, so that the code length can be set to have an arbitrary length. Further, the sensor cable is provided with a waveform shaping circuit for shaping the waveform of the signal flowing through the electric cord. Therefore, even when the entire length of the signal transmitting cable becomes longer, signal attenuation can be minimized. Thus, stable, high speed signal transmission becomes possible. The waveform shaping circuit may be provided for the sensing signal, or for both sensing signal and control signal.

In a preferred embodiment, the communication lines are twisted pairs, and the sensing signal or each of the sensing signal and the control signal is a high speed differential transmission signal. Specifically, though a co-axial cable may be used as the communication line, use of an inexpensive twisted pair allows reduction in manufacturing cost. Further, use of a twisted pair enhances flexure resistance, and therefore, even when the sensor head portion is attached to a movable portion and the cable is turned repeatedly, disconnection can be prevented. The high speed differential transmitting signal includes a low voltage differential transmission signal (LVDS).

In a preferred embodiment, the electric cord further includes a power supply line for supplying a driving power from the signal processing portion to the waveform shaping circuit. In this structure, it becomes unnecessary to separately provide a power supply line to the waveform shaping circuit, and therefore, troublesome handling of power supply cord is eliminated.

The "waveform shaping circuit" may be formed by using a waveform shaping buffer, or a serializer and a deserializer. The waveform shaping circuit may be provided in the middle of the component electric cord, or in the first or second connector half (case).

The present invention is particularly suitable for a displacement sensor or a visual sensor provided with a two-dimensional image pick-up device. These sensors employing the two-dimensional image pick-up device tend to provide large amount of sensing signals, and therefore, the sensor cable of the present invention proposed for high speed signal transmission would achieve striking effects.

Preferably, in the present invention, the first and second connector halves respectively holding the conductor terminals have body cases adapted to allow coupling of the connector halves with each other in a fixed state. Because of this arrangement, stress to a conductor terminal or to a wiring board on which the conductor terminal is mounted is almost eliminated, and thus, durability of the product can be enhanced.

According to the present invention, a plurality of sensor cables can be coupled and integrated, and therefore, the entire length can easily be changed. Further, as each cable is provided with a waveform shaping circuit, detection error and the like derived from signal attenuation or entrance of noise can be minimized even when the entire length of the cable is made longer.

According to a preferred embodiment, the sensor cable is to be used joined one after another for electrically connecting a sensor head portion and a signal processing portion of an amplifier-separated type sensor.

The sensor cable includes a first connector half holding a conductor terminal arrangement, a second connector half holding a conductor terminal arrangement, and an electric cord of a prescribed length for electrically connecting the conductor terminal arrangement of the first connector half to the conductor terminal arrangement of the second connector half The electric cord includes a first twisted pair of strand used for transmission from the signal processing portion to the sensor head portion and/or a second twisted pair of strand used for transmission from the sensor head portion to the signal processing portion.

The first connector half, the second connector half or an attachment added in the middle of the electric cord includes an electric circuit having a waveform shaping function. The electric circuit contains a serial/parallel converter converting a serial signal coming in the form of a differential signal through specific two conductor terminals of the conductor terminal arrangement (or specific two twisted pair 1 of strands of the electric cord) to a parallel signal, and a paralle/serial converter converting the parallel signal obtained from the serial/parallel converter to a serial signal, and outputting the serial signal in the form of a differential signal to specific two twisted pair of strands of the electric cord (or two specific conductor terminals of the conductor terminal arrangement).

The serial/parallel converter externally outputs a binary self synchronization confirmation signal. The self synchronization confirmation signal is adapted to assume "1" when synchronization is not established and "0" when synchronization is established, while the parallel/serial converter is adapted to start a paralle/serial converting operation upon arrival of a parallel signal to an input side.

The electric circuit additionally includes an OR (logical sum) circuit providing a signal corresponding to an OR of a synchronization confirmation signal of each preceding unit arriving through a specific one conductor terminal of the conductor terminal arrangement (or one specific signal strand of the electric cord) and the self synchronization confirmation signal output from the serial/parallel converter as a new synchronization confirmation signal of each preceding unit to a specific one signal strand of the electric cord (or one specific conductor terminal of the conductor terminal arrangement).

Accordingly, if synchronization is lost in any of the plurality of cables joined and coupled to each other, the signal processing portion or the sensor head portion as a transmitting side apparatus is notified of the loss, through one signal strand.

In this structure, as each includes a waveform shaping circuit, a plurality of cables can be joined one after another (extended) to attain a desired length, without causing signal attenuation. Further, as the synchronization confirmation signals of unit cables are integrated onto one signal line by an OR circuit, when serial communication goes out of synchronization in any of the cables, information to that effect can be notified immediately to the transmitting end (sensor head portion or signal processing portion) through a minimum number of signal lines.

According to another aspect, the present invention provides a sensor cable to be used joined one after another for electrically connecting a sensor head portion and a signal processing portion of an amplifier-separated type sensor.

The sensor cable also has a first connector half holding a conductor terminal arrangement, a second connector half holding a conductor terminal arrangement, and an electric cord of a prescribed length for electrically connecting the conductor terminal arrangement of the first connector half to the conductor terminal arrangement of the second connector half The electric cord includes a first twisted pair of strand used for transmission from the signal processing portion to the sensor head portion and/or a second twisted pair of strand used for transmission from the sensor head portion to the signal processing portion.

The first connector half, the second connector half or an attachment added in the middle of the electric cord includes an electric circuit having a waveform shaping function. The electric circuit contains a serial/parallel converter converting a serial signal coming in the form of a differential signal through specific two conductor terminals of the conductor terminal arrangement (or specific two twisted pair of strands of the electric cord) to a parallel signal, and a parallel/serial converter converting the parallel signal obtained from the serial/parallel converter to a serial signal, and outputting the serial signal in the form of a differential signal to specific two twisted pair of strands of the electric cord (or two specific conductor terminals of the conductor terminal arrangement).

The electric circuit additionally includes a bypass outputting a last stage synchronization confirmation signal arriving through a specific one conductor terminal of the conductor terminal arrangement (or one specific signal strand of the electric cord) directly to a specific one signal strand of the electric cord (or one specific conductor terminal of the conductor terminal arrangement).

Therefore, when synchronization is lost in any of the plurality of cables joined and coupled, information to that effect can be notified to the signal processing apparatus or the sensor head portion as the transmitting side apparatus, through one signal strand.

In this structure, as each includes a waveform shaping circuit, a plurality of cables can be joined one after another (extended) to attain a desired length, without causing signal attenuation. Further, the terminal stage synchronization confirmation signal obtained from the signal processing portion or sensor head portion as the receiving end is returned through a bypass to the sensor head portion or the signal processing portion as the transmitting end. Therefore, when serial communication goes out of synchronization in any of the cables, after the detection thereof by the receiving end, information to that effect can be notified immediately to the transmitting end (sensor head portion or signal processing portion) through a minimum number of signal lines.

In a preferred embodiment, in any of the first connector half, the second connector half and an attachment portion added in the middle of the electric cord, a communication state indicator driven by the self synchronization confirmation signal output from the serial/parallel converter is provided. Because of this arrangement, when synchronization is lost between any of the cables, it can immediately be confirmed visually, and if the cause is unsatisfactory connection, the corresponding connection can immediately be addressed and recovered.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 20 is a general flow chart of a transmitting process executed by the sensor head portion and the signal processing portion in accordance with the second embodiment.

DESCRIPTION OF THE PREFERRED EMBODIMENTS

In the following, suitable embodiments of the present invention will be described in detail with reference to the figures. The embodiments described below are only the examples of the invention, and the gist of the present invention is specified only by the description of the claims.

First Embodiment

Figure 1:
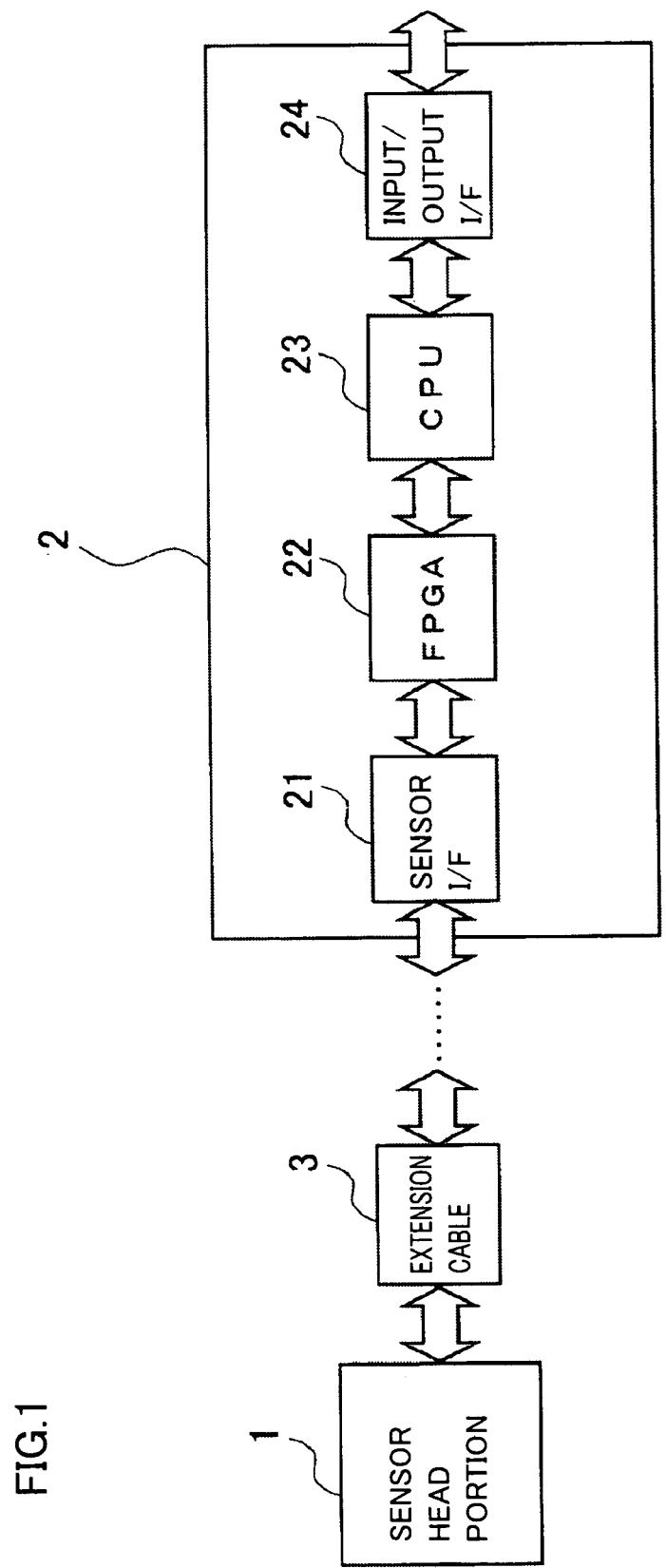
FIG. 1 shows a configuration of an amplifier-separated type sensor in accordance with a first embodiment of the present invention.

Referring to FIG. 1, an amplifier-separated type sensor in accordance with the first embodiment of the present invention includes a sensor head portion 1 and a signal processing portion 2, connected by one or more sensor cables.

Various sensors including a displacement sensor, a visual sensor, a micro-wave sensor, an end-measuring sensor and the like may be used as the sensor head portion.

Signal processing portion 2 includes a sensor interface 21 taking a sensing signal from sensor head portion 1 and transmitting a control signal to sensor head portion 1, an FPGA (Field Programmable Gate Array) 22 as a programmable logic circuit, a CPU 23 mainly formed by a microprocessor, and an input/output interface 24, connected in series by a transmission path.

Figure 2:
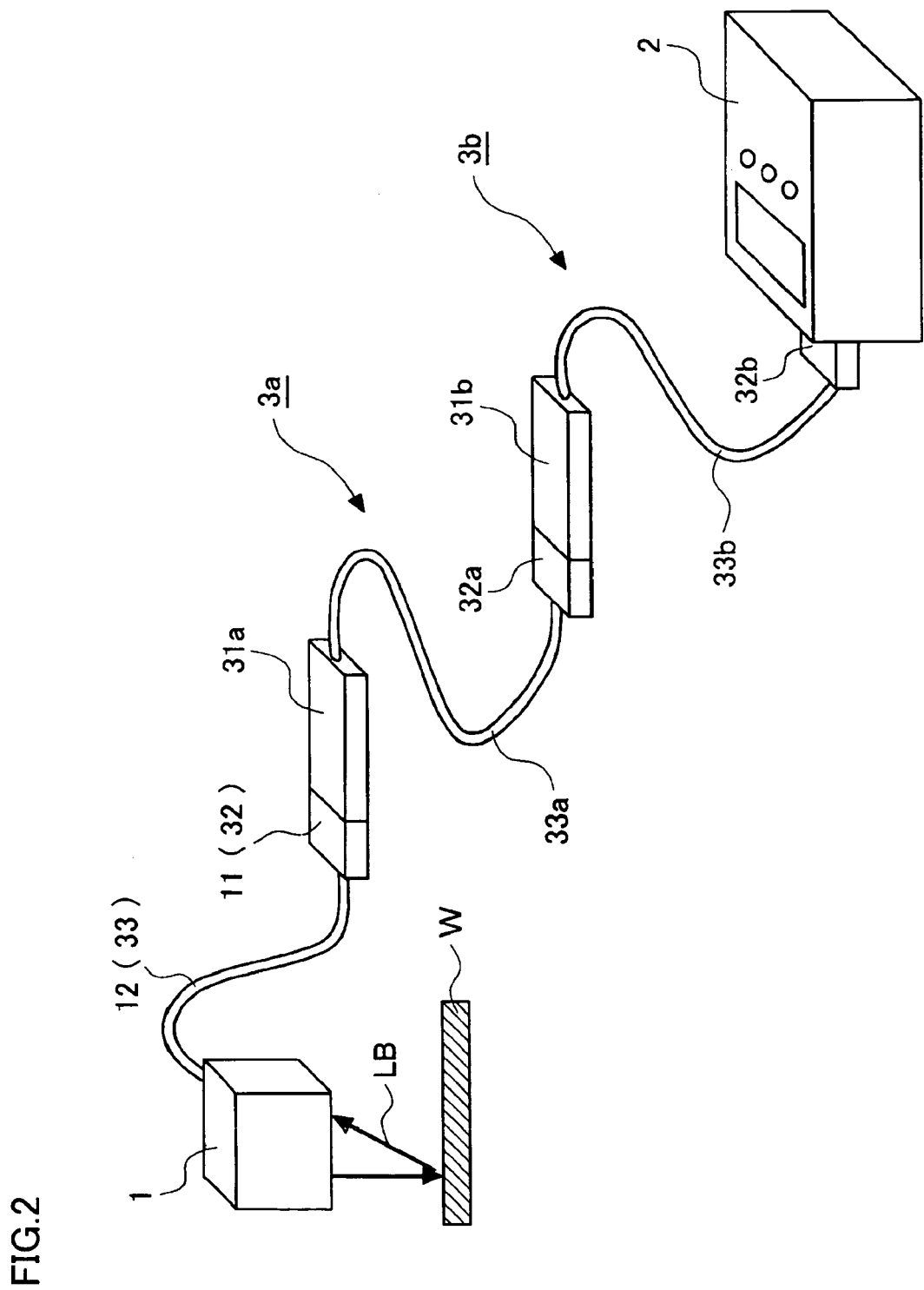
FIG. 2 shows an example of the amplifier-separated type sensor employing a sensor cable in accordance with the first embodiment of the present invention.

Referring to FIG. 2, the amplifier-separated type sensor employing the sensor cable of the present invention will be described. In this example, a displacement sensor head portion 1 emitting a line beam LB to an object W to be detected, and a signal processing portion 2 are connected by two sensor cables (3a, 3b). Each sensor cable includes a female connector 31 (first connector half) having a wiring board on which a waveform shaping circuit is formed, a male connector 32 (second connector half), and an electric cord 33 connecting these connectors. In the figure, reference character 12 denotes an electric cord drawn from sensor head portion 1, of which structure is the same as the electric cord of the sensor cable. In the figure, reference character 11 denotes a connector connected to electric cord 12, of which structure is the same as male connector 32 of the sensor cable.

Figure 3:
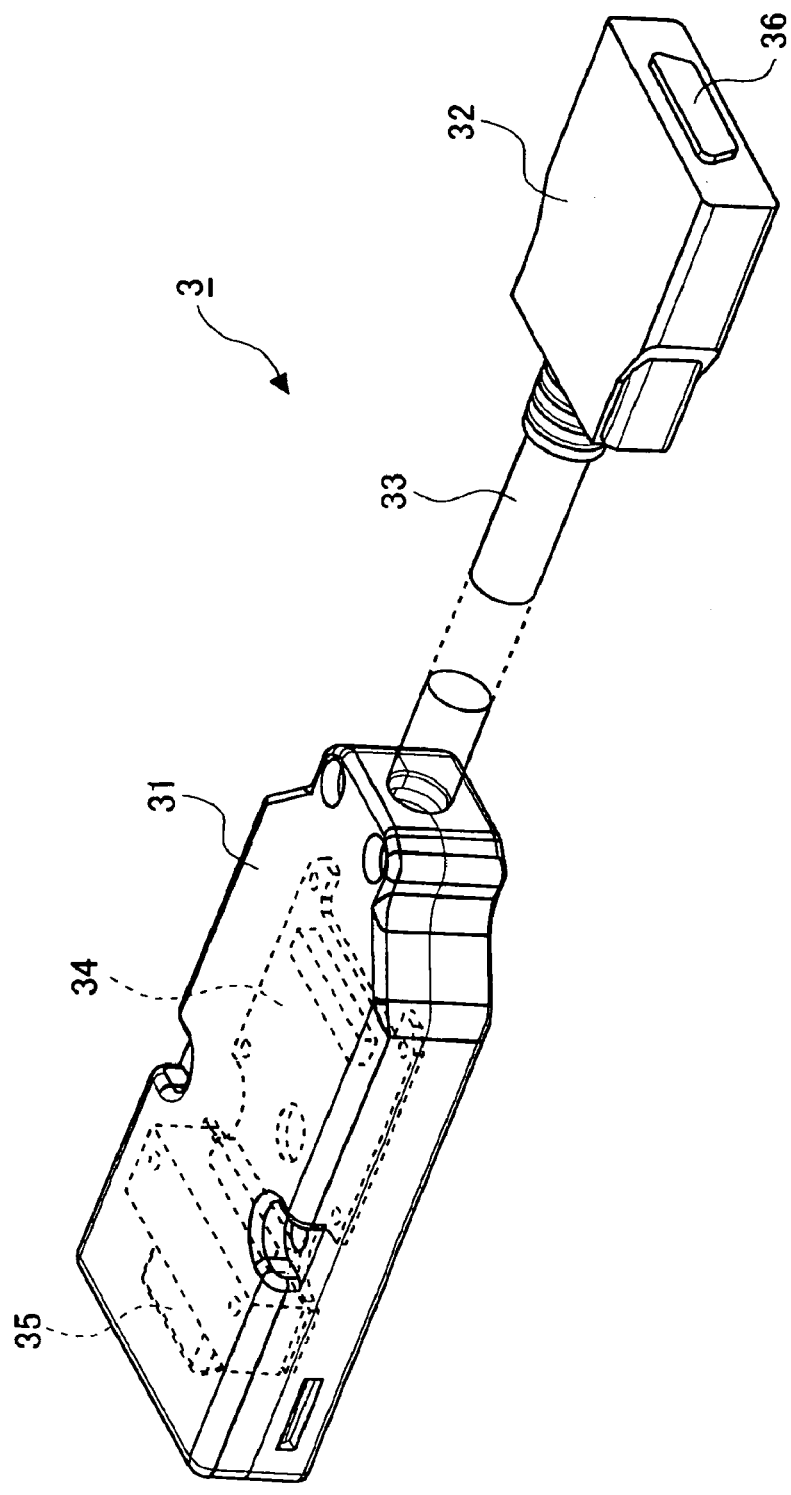
FIG. 3 is a see-through illustration showing a structure of the sensor cable in accordance with the first embodiment.

Referring to FIG. 3, the structure of the sensor cable in accordance with the present invention will be described. In an outer housing case of female connector 31, a wiring board 34 is mounted. Though not explicitly shown in the figure, on one end (left end in the figure) of female connector 31, an opening to which male connector 32 of another sensor cable of the same specification is to be inserted and a space for accommodating the male connector are provided. At a portion slightly deeper from the opening, a conductor terminal 35 is arranged. In male connector 32, a conductor terminal 36 is arranged slightly projected from an end surface (right end in the figure) of the outer housing case.

Figure 4:
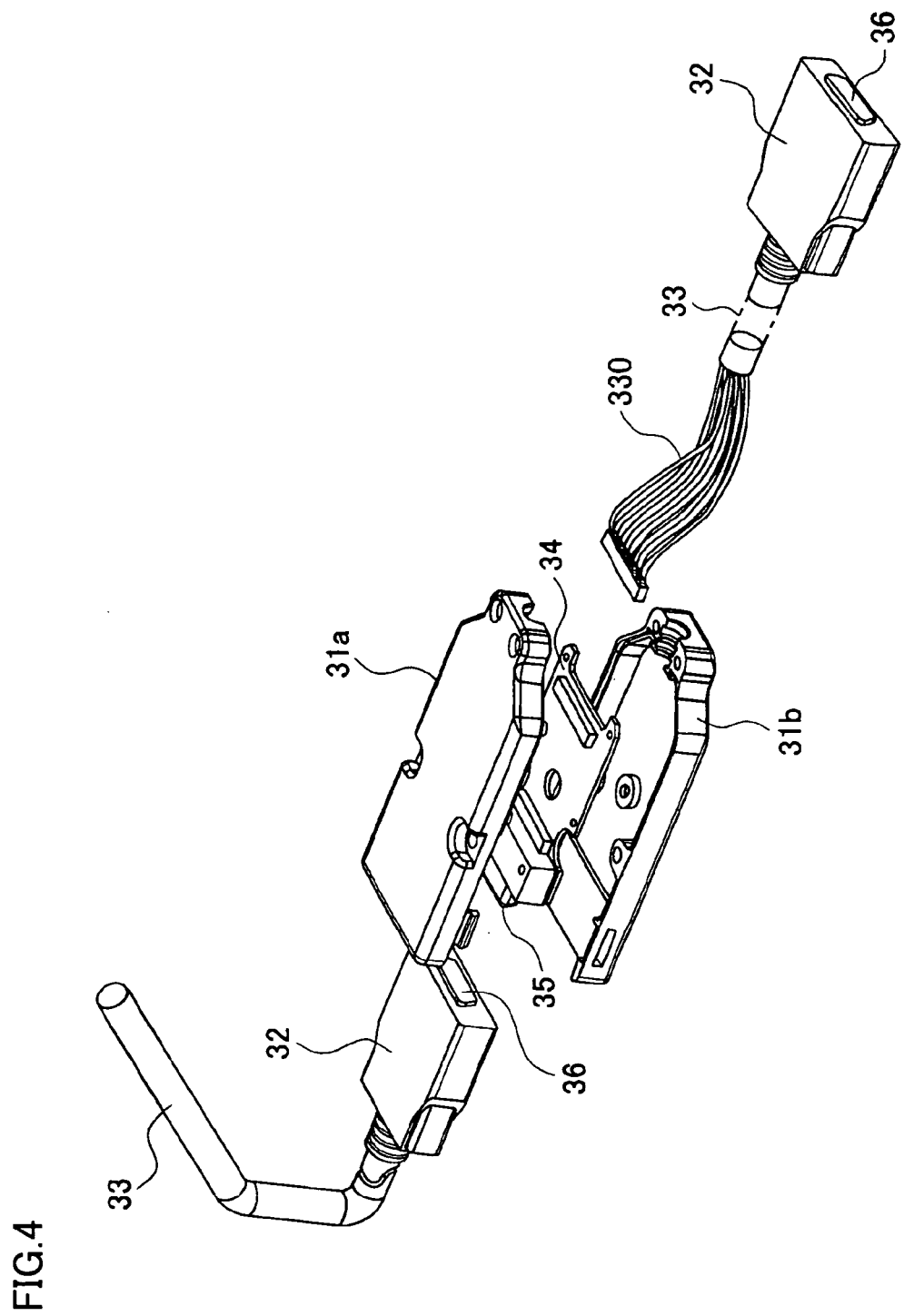
FIG. 4 is an exploded perspective view showing a structure of the sensor cable in accordance with the first embodiment.

Referring to FIG. 4, detailed structure of the sensor cable in accordance with the present invention will be described. The same portions as those shown in FIG. 3 are denoted by the same reference characters, and description thereof will not be repeated.

As shown in FIG. 4, female connector 31 is an assembly of wiring board 34, an upper housing case 31a and a lower housing case 31b. In this example, conductor terminal 35 is fixedly connected to wiring board 34. In the figure, reference character 330 denotes a sensing signal communication line (first communication line) and a control signal communication line (second signal line) included in electric cord 33. Each communication line is formed, in this example, as a twisted pair.

Figure 5A:
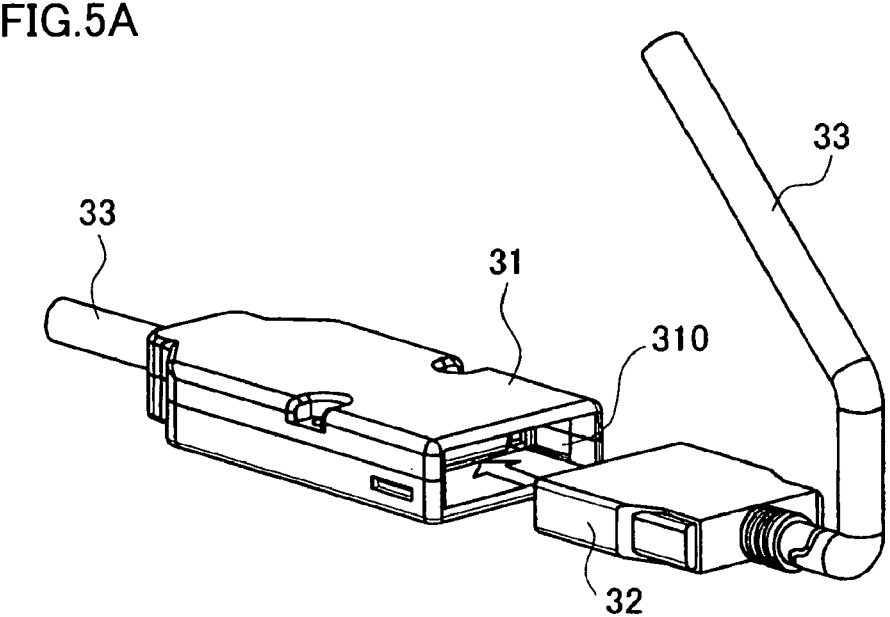
FIGS. 5A and 5B represent durability of the sensor cable in accordance with the first embodiment of the present invention.
Figure 5B:
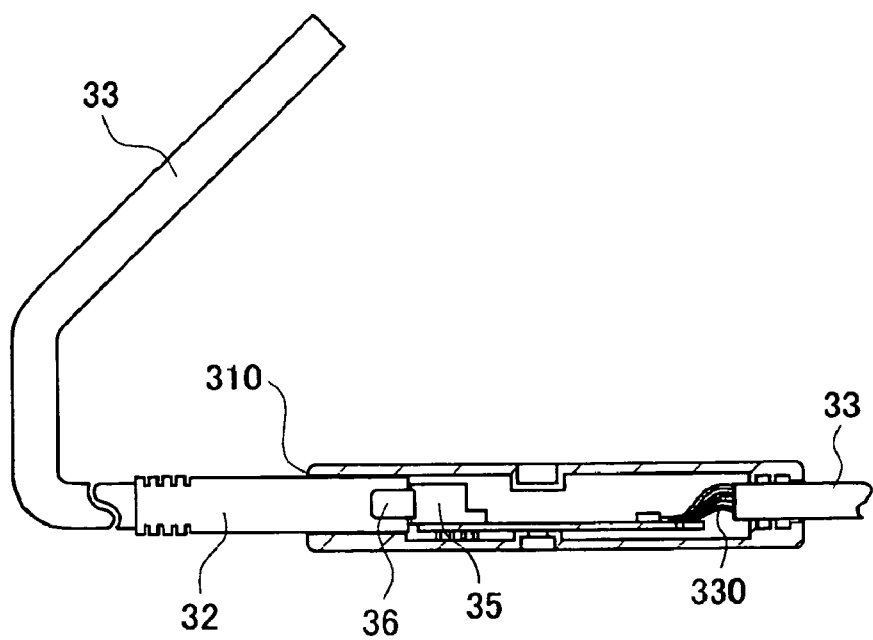

FIG. 5A shows a state before coupling, and FIG. 5B shows a state after coupling.

As shown in FIG. 5A, male connector 32 is inserted (press-fit) to opening 310 of female connector 310. When both connectors are coupled properly, conductor terminals 35 and 36 are electrically connected, tightly in contact with each other. In this state, connection stability of the connectors depends on connection strength of the outer housing cases of the connectors.

Figure 6:
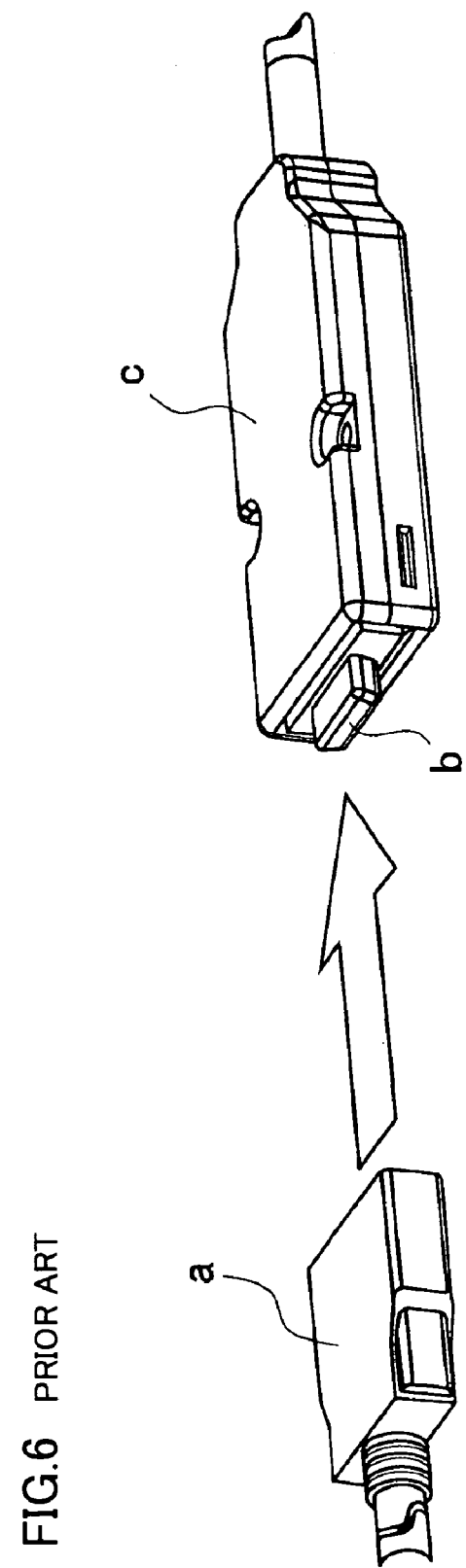
FIG. 6 shows a general connector structure.

Referring to FIG. 6, a conventional, general connector structure will be described. As can be clearly seen from the figure, in most of the conventional connectors of this type, conductor terminal b of one connector is held projected from the outer housing case c. When the connectors are connected in this manner, the connectors are fixed by the coupling strength between the conductor terminals. Therefore, even in the connected state, the connectors move when the cable is pulled or moved. Consequently, the conductor terminals are also moved, causing stress at a connecting portion to the circuit board. The stress tends to cause malfunction, including damage or disconnection of the circuit board.

In contrast, in the sensor cable of the present invention, stress on the conductor terminals (circuit board) is small even when the connectors are connected, and therefore, durability can be improved.

Figure 7:
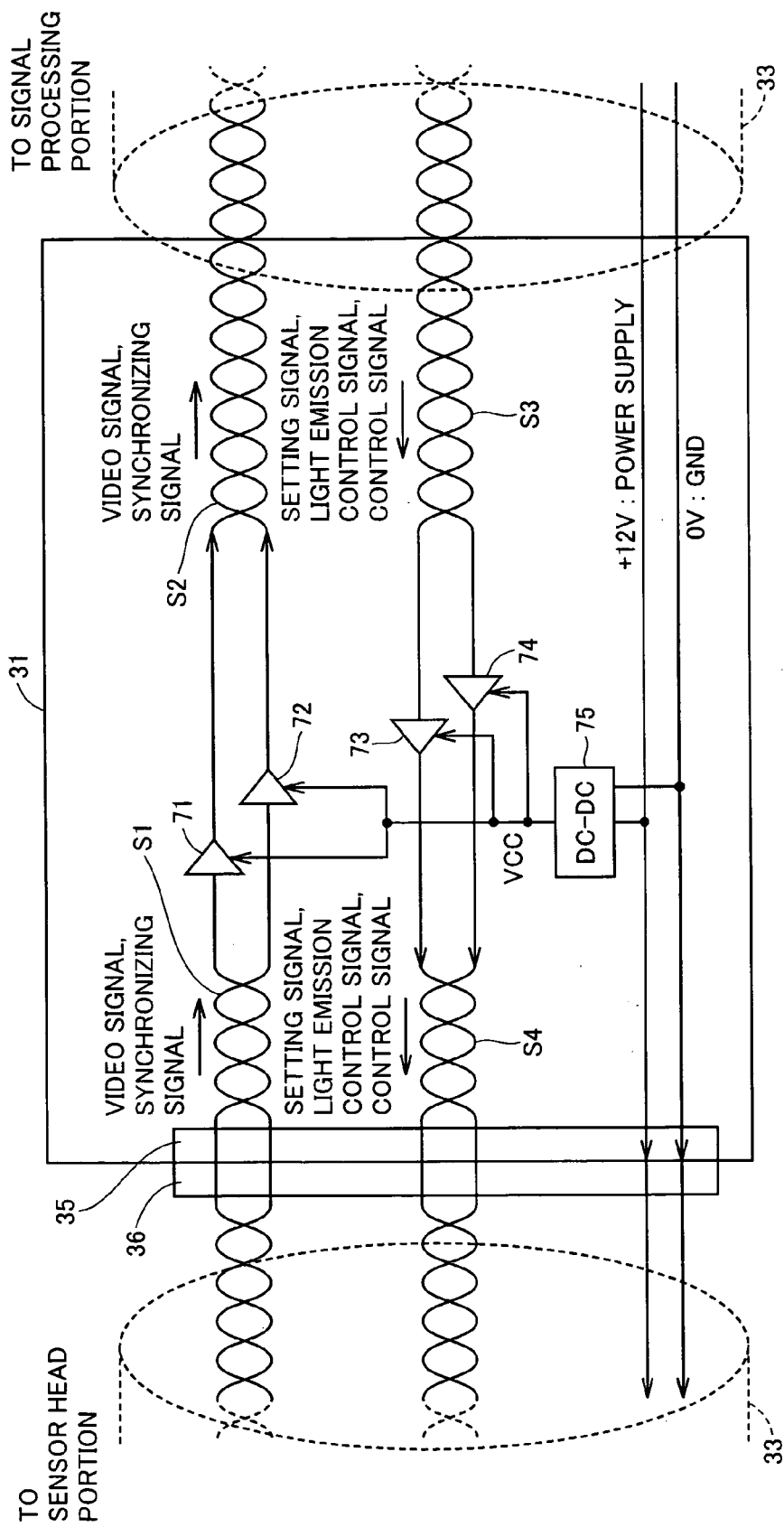
FIG. 7 is an illustration (part 1) showing an internal circuit structure of the connector in accordance with the first embodiment.

Referring to FIG. 7, an internal circuit structure of female connector 31 of the sensor cable in accordance with the present invention will be described. In this example, from the side of the sensor head portion, a sensing signal (video signal, synchronizing signal) is transmitted through communication line S1 (twisted pair) of electric cord 33. The sensing signal has its waveform shaped by waveform shaping buffers 71 and 72 mounted on the circuit board, and transmitted to communication line S2 of electric cord 33 on the side of the signal processing portion. From the side of the signal processing portion, a control signal (setting signal, light emission control signal, control signal) is transmitted through communication line S3 of electric cord 33. The control signal has its waveform shaped by waveform shaping buffers 73 and 74 mounted on the circuit board, and transmitted to communication line S4 of electric cord 33 on the side of the sensor head portion. In this example, a power feed line for feeding driving power from the signal processing portion to waveform shaping buffers 71, 72, 73 and 74 is pulled into female connector 31, and by a DC—DC converter 75, power of 3.3 V is supplied to the buffers.

Figure 8:
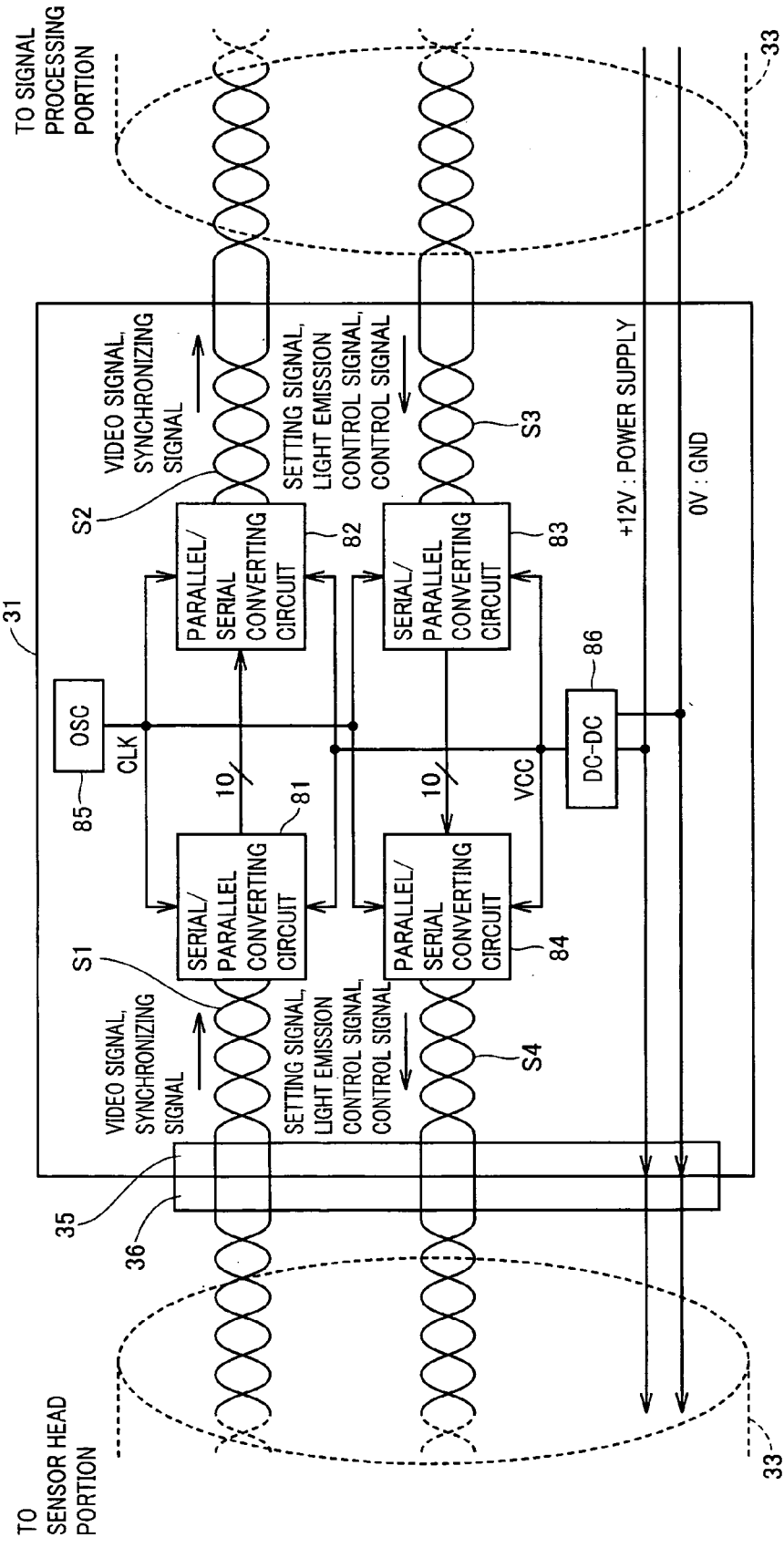
FIG. 8 is an illustration (part 2) showing an internal circuit structure of the connector in accordance with the first embodiment.

The internal circuit configuration of female connector 31 of the sensor cable in accordance with the present invention may have such a structure as shown in FIG. 8. In this example, from the side of the sensor head portion, a sensing signal (video signal, synchronizing signal) is transmitted through communication line S1 (twisted pair). The sensing signal is transmitted such that the sensing signal as a serial signal is converted to a 10-bit parallel signal by a deserializer 81 mounted on the circuit board, converted again to a serial signal by serializer 82, and transmitted to communication line S2 of electric cord 33 on the side of the signal processing portion. Further, from the side of the signal processing portion, a control signal (setting signal, light emission control signal, control signal) is transmitted through communication line S3 of electric cord 33. The control signal is transmitted such that the control signal as a serial signal is converted to a 10-bit parallel signal by a deserializer 83 mounted on the circuit board, converted again to a serial signal by serializer 84, and transmitted to communication line S4 of electric cord 33 on the side of the sensor head portion. In this example also, a power feed line for feeding driving power from the signal processing portion to serializers 82 and 84 as well as to deserialisers 81 and 83 is pulled into female connector 31, and by a DC—DC converter 86, power of 3.3 V is supplied. In this example, the serializers and deserializers play the role of waveform shaping circuits, and therefore, an oscillator (OSC) 85 is mounted for providing a clock thereto.

Figure 9:
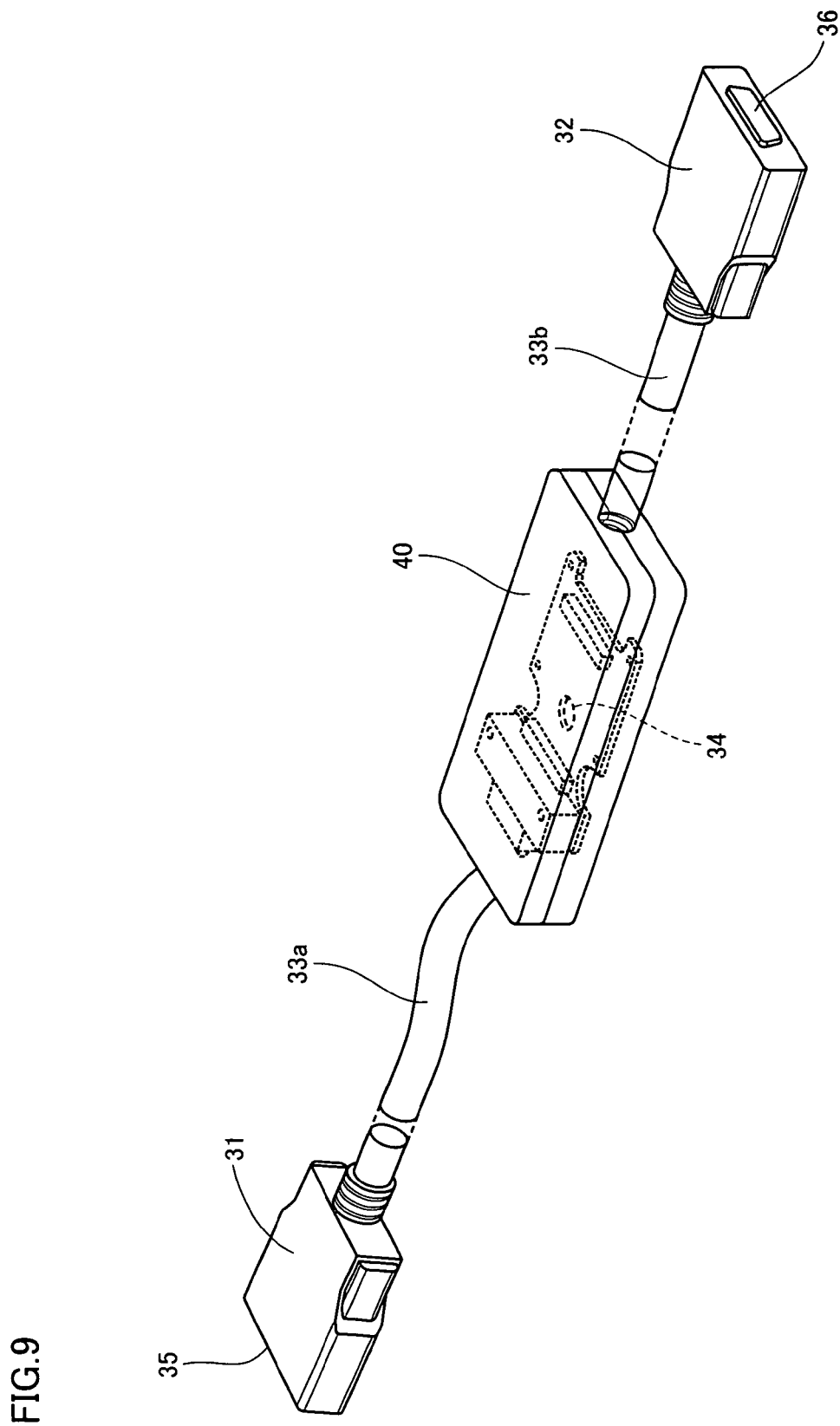
FIG. 9 shows a modification of the first embodiment of the present invention.

Referring to FIG. 9, the sensor cable of this example has female connector 31 on one end and male connector 32 on the other end. From female connector 31, electric cord 33*a* is drawn out, and from male connector, electric cord 33*b* is drawn out. Between these electric cords 33*a* and 33*b*, a repeater 40 connecting these electric cords is provided. In this example, circuit board 34 is contained in repeater 40.

Figure 10:
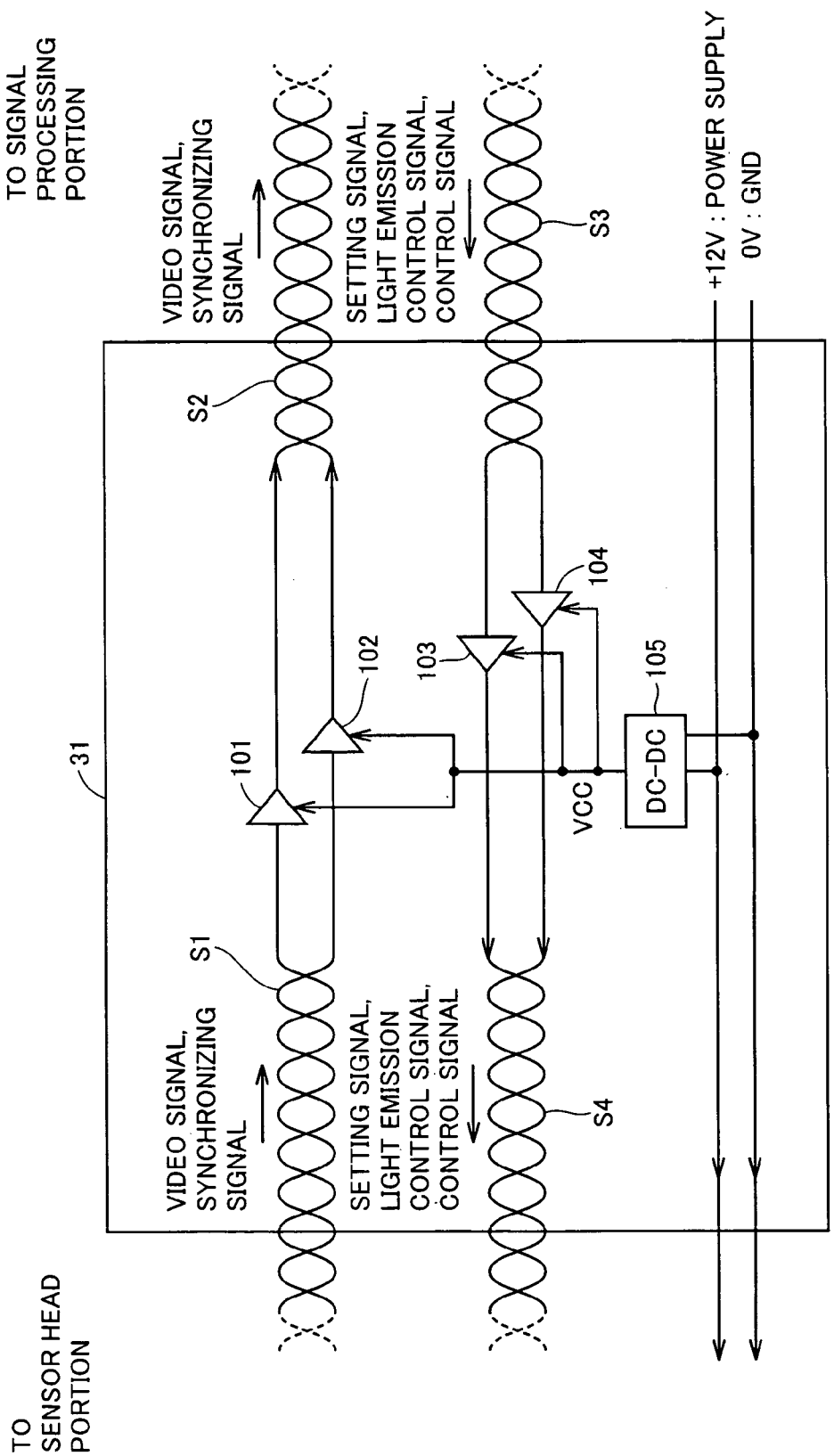
FIG. 10 is an illustration (part 1) showing an internal circuit structure of the connector in accordance with the modification of the first embodiment.

Referring to FIG. 10, an internal circuit configuration of female connector 31 of the sensor cable in accordance with a modification of the first embodiment of the present invention will be described. In this example, from the side of the sensor head portion, a sensing signal (video signal, synchronizing signal) is transmitted through communication line S1 (twisted pair) of electric cord 33*a*. The sensing signal (video signal, synchronizing signal) has its waveform shaped by waveform shaping buffers 101 and 102 mounted on the circuit board, and transmitted to communication line S2 of electric cord 33*b* on the side of the signal processing portion. Further, from the side of the signal processing portion, a control signal (setting signal, light emission control signal, control signal) is transmitted through communication line S3 of electric cord 33*b*. The control signal has its waveform shaped by waveform shaping buffers 103 and 104 mounted on the circuit board, and transmitted to communication line S4 of electric cord 33*a* on the side of the sensor head portion. In this example also, a power feed line for feeding driving power from the signal processing portion to waveform shaping buffers 101, 102, 103 and 104 is pulled into female connector 31, and by a DC—DC converter 105, power of 3.3 V is supplied to the buffers.

Figure 11:
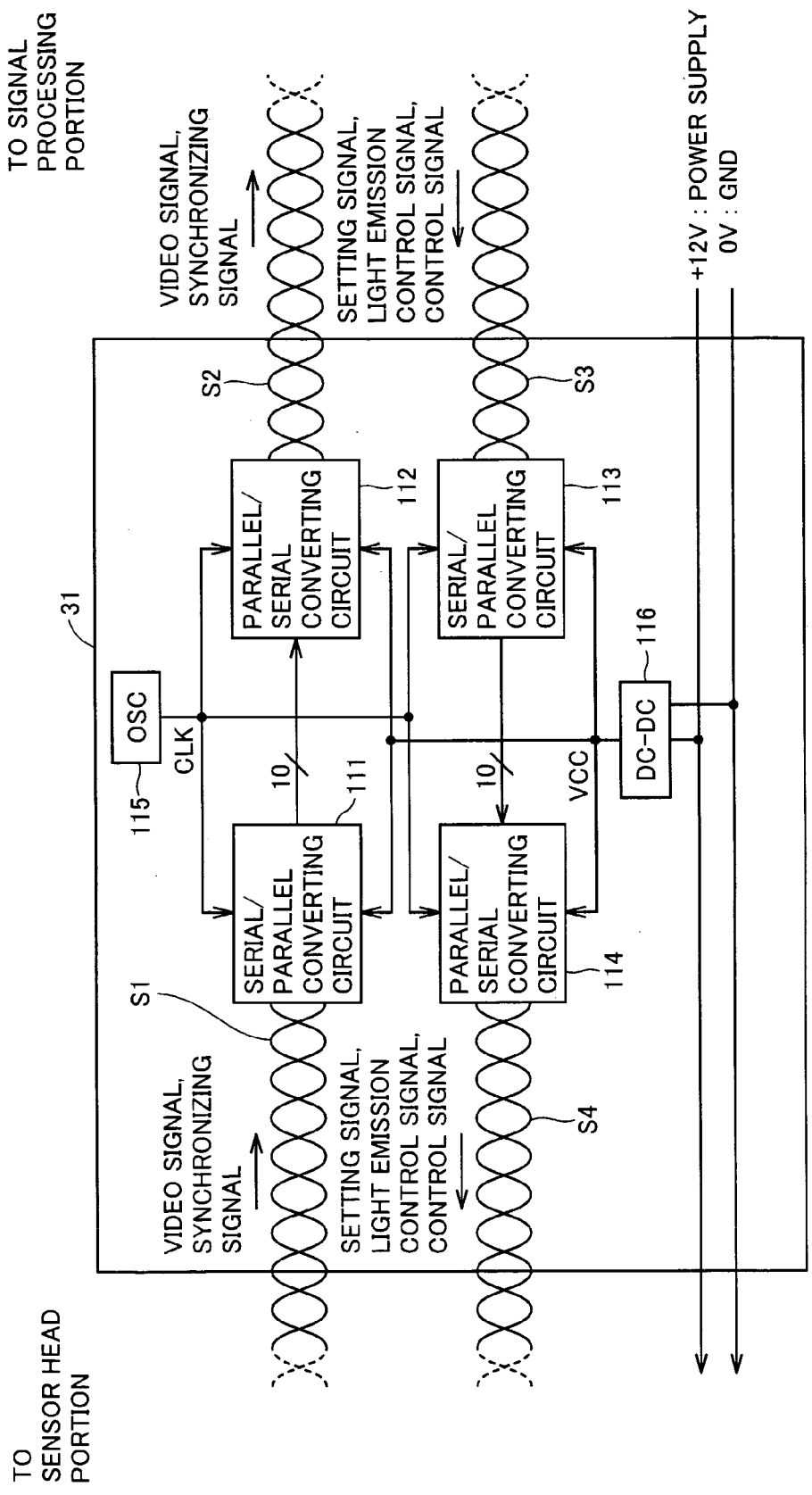
FIG. 11 is an illustration (part 2) showing an internal circuit structure of the connector in accordance with the modification of first embodiment.

Referring to FIG. 11, an internal circuit configuration of female connector 31 of the sensor cable in accordance with a modification of the first embodiment of the present invention will be described. In this example, from the side of the sensor head portion, a sensing signal (video signal, synchronizing signal) is transmitted through communication line S1 (twisted pair) of electric cord 33*a*. The sensing signal is transmitted such that the sensing signal as a serial signal is converted to a 10-bit parallel signal by a deserializer 111 mounted on the circuit board, converted again to a serial signal by serializer 112, and transmitted to communication line S2 of electric cord 33*b* on the side of the signal processing portion. Further, from the side of the signal processing portion, a control signal (setting signal, light emission control signal, control signal) is transmitted through communication line S3 of electric cord 33*b*. The control signal is transmitted such that the control signal as a serial signal is converted to a 10-bit parallel signal by a deserializer 113 mounted on a circuit board, converted again to a serial signal by serializer 114, and transmitted to communication line S4 of electric cord 33*a* on the side of the sensor head portion. In this example also, a power feed line for feeding driving power from the signal processing portion to serializers 112 and 114 as well as to deserialisers 111 and 113 is pulled into female connector 31, and by a DC-DC converter 116, power of 3.3 V is supplied. In this example also, the serializers and deserializers play the role of waveform shaping circuits, and therefore, an oscillator (OSC) 155 is mounted for providing a clock thereto.

As is apparent from the foregoing, the present invention provides a sensor cable of which entire length can easily be changed and which suppresses as much signal attenuation and noise as possible even when the entire length thereof is made longer, in high speed signal transmission.

In the foregoing, examples in which waveform shaping circuits are provided both for the sensing signal and the control signal have been described. If high speed transmission of the control signal is unnecessary, the waveform shaping circuit may be provided only for the sensing signal that is to be differentially transmitted at high speed.

Though two sensor cables are connected in the embodiments above, three or more sensor cables can naturally be connected.

Further, though a displacement sensor has been described as an example in the embodiments above, the sensor cable in accordance with the present invention may be used for various sensors of the amplifier-separated type.

Second Embodiment

In the first embodiment, a plurality of cables are joined to make the cable longer, and a waveform shaping circuit (by way of example, a combination of a serial/parallel converter and a parallel/serial converter) is inserted to each cable portion, so as to suppress waveform degradation and voltage drop caused by the resistance. Here, if synchronization in serial communication is lost between adjacent cables and the out-of-synchronization (out-of-sync) state is not recognized by the signal processing portion or the sensor head portion as the transmitting end, sensor operation may possibly fail. Generally, an IC used as a serial/parallel converter in this type of serial communication has a function of detecting the out-of-sync state in the serial communication and generating a prescribed binary signal. If the out-of-sync detection signal generated from the serial/parallel converting IC of each cable were to be transmitted separately as notification to the sensor head portion or the signal processing portion as the transmitting side, independent signal lines for notification corresponding in number to the number of connected cables would be necessary. This leads to enlarged diameter of the cable, and even if a cable were formed using stranded steel core, flexibility would significantly be degraded.

In the second embodiment, a sensor cable will be described which can be elongated to an arbitrary length by joining a plurality of cables and that can inform the transmitting end (sensor head portion or signal processing portion) of the out-of-sync state occurred in serial communication in any of the cables through a minimum number of signal lines. Further, a sensor cable will be described in which the out-of-sync state occurred in serial communication in any of the cables can be immediately and visually recognized.

Figure 13:
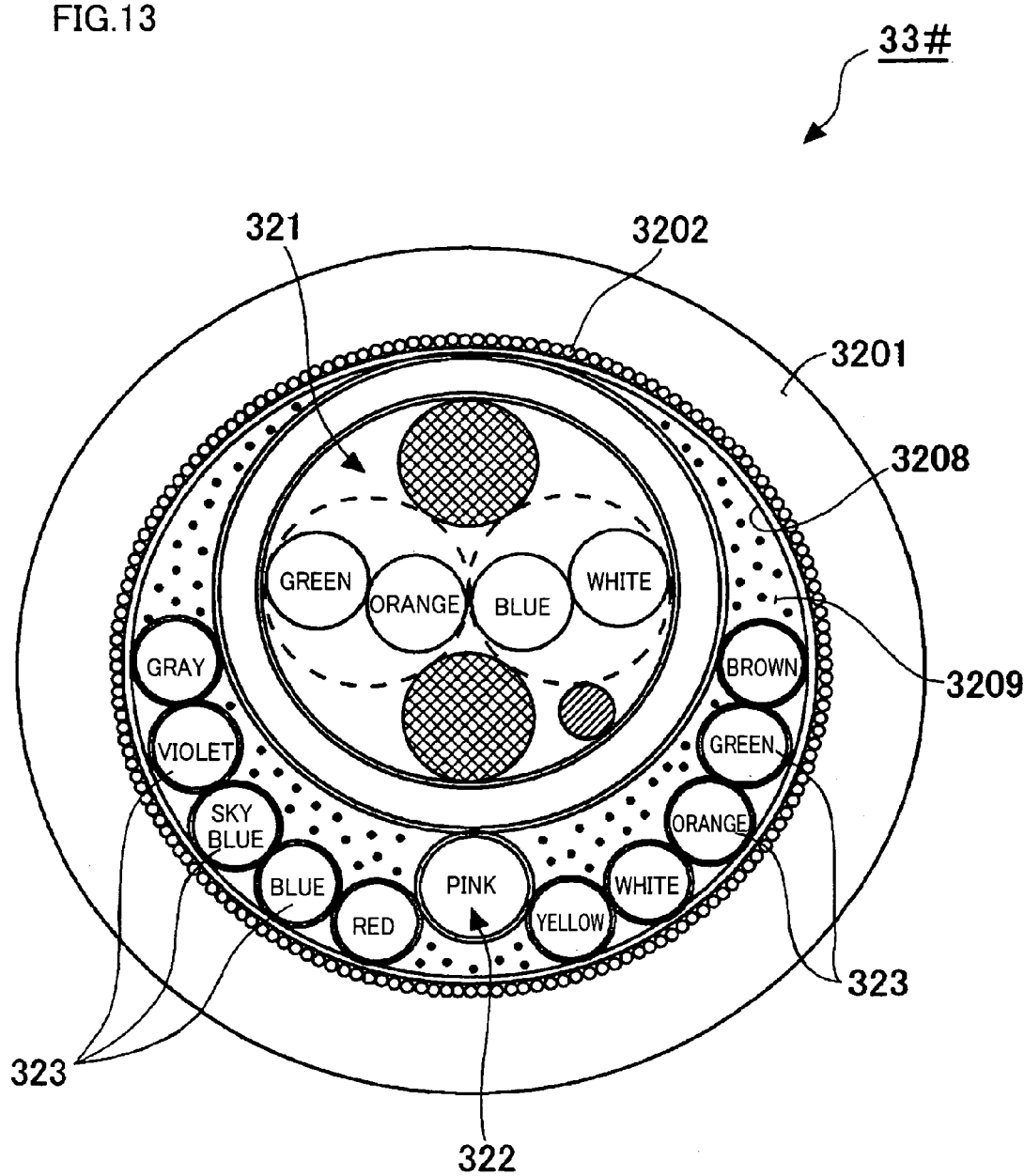
FIG. 13 is a cross section of the cable portion in accordance with the second embodiment.
Figure 14:
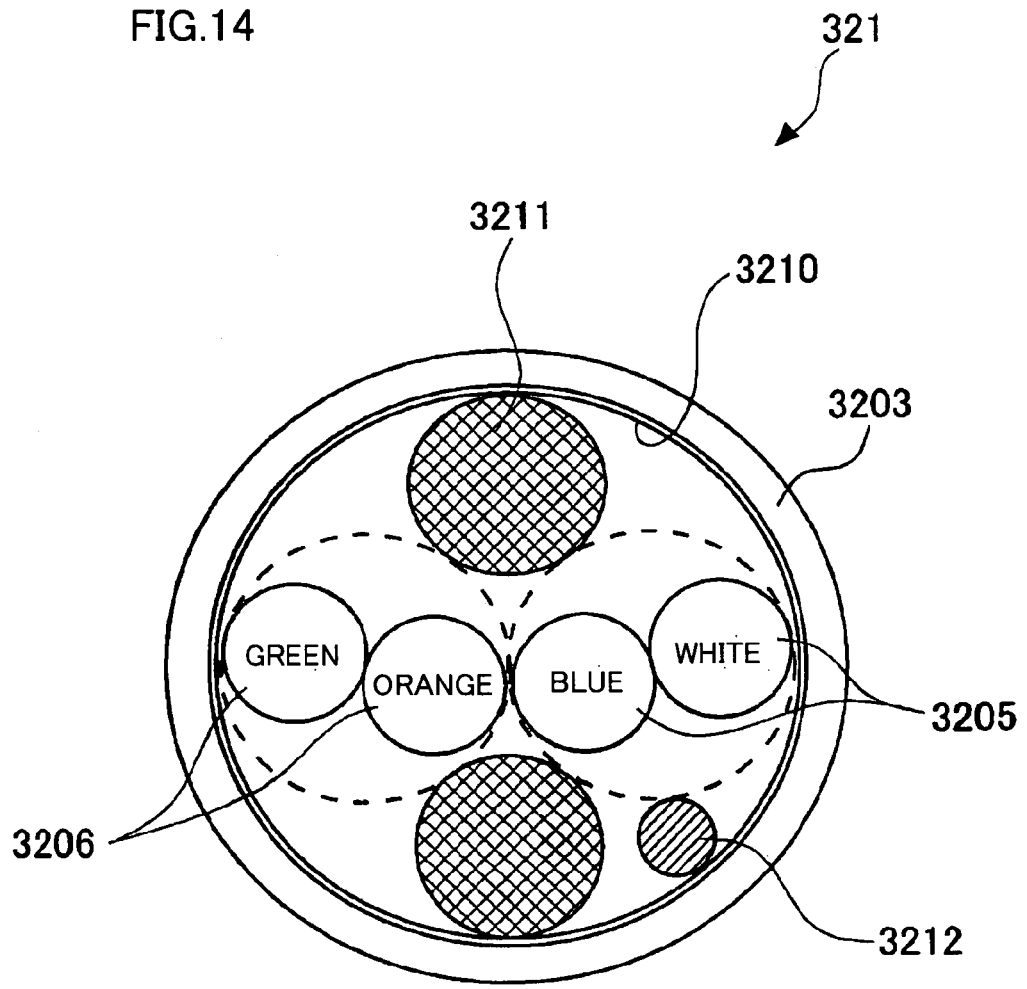
FIG. 14 is a partial cross section of the cable portion in accordance with the second embodiment.

The electric cord (in the following, also referred to as a cable portion) 33# in accordance with the second embodiment of the present invention will be described with reference to FIGS. 12 to 14.

Figure 12:
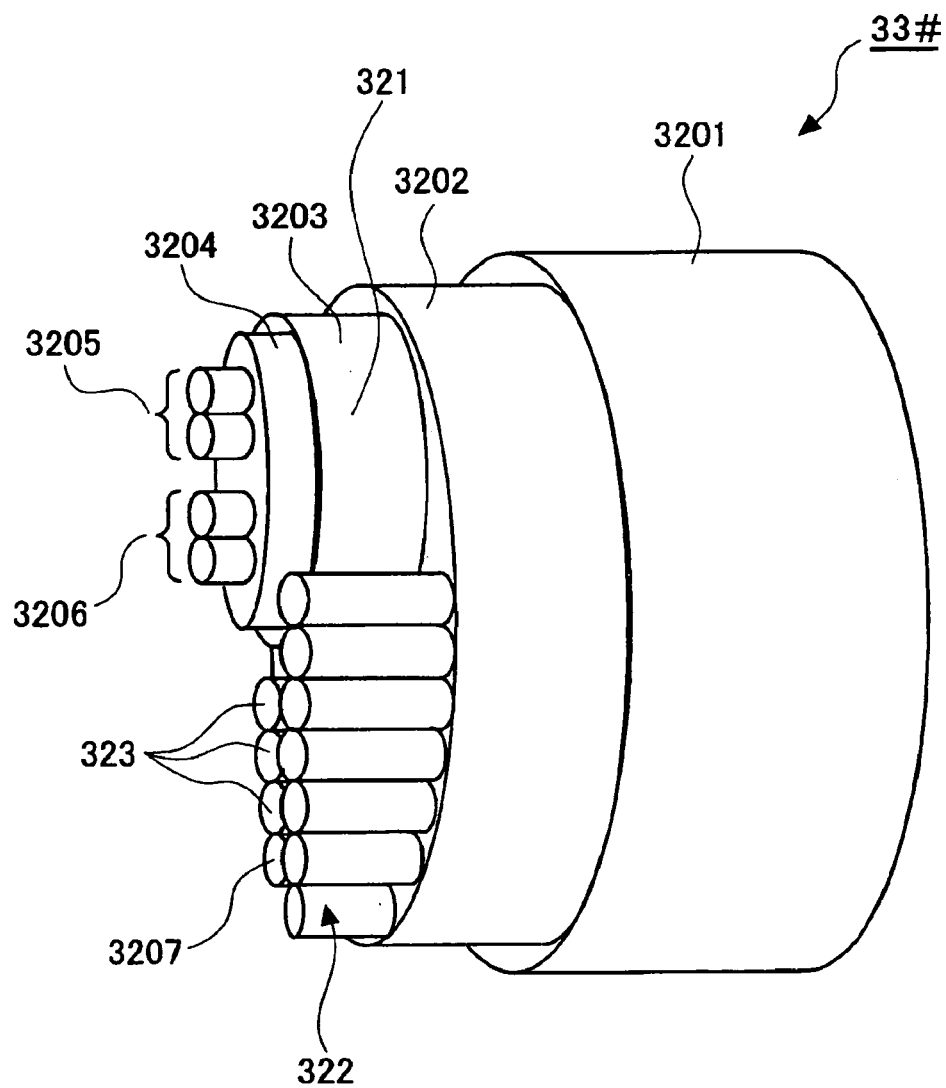
FIG. 12 shows a structure of a core of the cable portion in accordance with a second embodiment.

Referring to FIG. 12, electric cord 33 includes a first core line 321, a second core line 322, a third core line 323, a cover 3201, a shield layer 3202, a sheath 3203, a shield layer 3204, a twisted pair of strand 3205 (outgoing), a twisted pair of strand 3206 (incoming), a single strand 3207, an insulating layer 3208 (paper tape), an insertion 3209, a shield layer 3210 (aluminum foil tape), an insertion 3211 and a drain wire 3212.

As is apparent from these figures, the cable includes first, second and third core lines 321, 322 and 323. The first core line 321 includes twisted pair of strand (outgoing) 3205 and twisted pair of strand (incoming) 3206, which are the main portions of the present invention. These two lines of twisted pair of strands 3205 and 3206 are contained in a space surrounded by sheath 5203 and shield layer (aluminum foil tape) 3210. In this space, in addition to the twisted pair of strands 3205 and 3206, insertion 3211 and drain wire 3212 are contained.

In the figure, "green" and "orange" denote two strands forming twisted pair of strand (outgoing) 3206, and "blue" and "white" denote two strands lines forming twisted pair line (incoming) 3205, and the colors respectively represent the colors of covers. As can be seen from FIG. 13, second core line 322 is formed by one single strand 3207, and the third core line 323 is formed by ten single strand 3207. In this example, the diameter of the second core line 322 is made slightly larger than the diameter of each of the ten strands forming the third core line 323. The second core line 322 is used as a power line for supplying power from the signal processing portion 2 to the sensor head portion 1 in this example. These three types of core lines, that is, first, second and third core lines 321, 322 and 323 are contained in a space surrounded by a laminated body of cover 3201, shield layer 3202 and insulating layer (paper tape) 3208 with insertion 3209 filled.

In the figure, "pink" denotes the color of second core line 322, and similarly, "gray", "violet", "sky blue", "blue", "red", "yellow", "white", "orange", "green" and "brown" denote the colors often single strand 3207 forming the third core line 323.

As described above, the cable portion 33# of the present invention includes two lines of twisted pair of strands 3205 and 3206, the second core line 322 as one power supply line, and third core line 323 consisting of ten single strand. The first core line 321 is physically and electro-statically separated from other core lines (second and third core lines 322, 323) by sheath 3203 and shield layer 3210. Further, the three core lines 321 to 323 as a whole are surely separated physically and electro-statically by cover 3201, shield layer 3202 and insulating layer (paper tape) 3208. Further, to avoid voltage drop, the second core line 322 for power supply is adapted to have larger diameter than other core lines 323.

Figure 15:
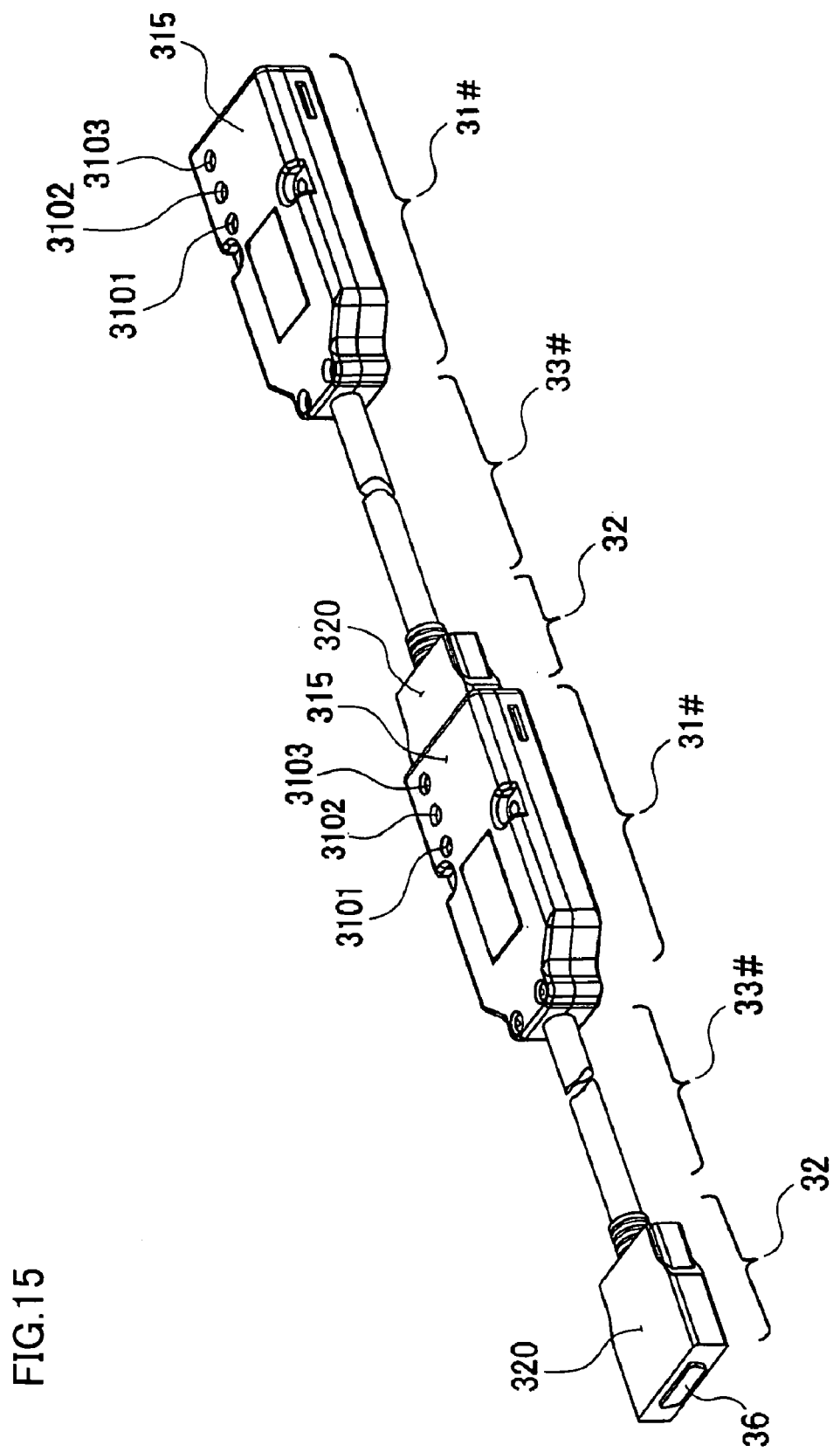
FIG. 15 is a perspective view showing the appearance of two extension cables joined together, in accordance with the second embodiment.

Next, description will be made with reference to FIG. 15, which is a perspective view showing two extension cables 3 joined together. As is apparent from the figure, female connector 31# has an approximately rectangular, thin case 315. On a surface (upper surface in the figure) of case 310, a conduction state indicator 3101, a communication state indicator (outgoing) 3102, and a communication state indicator (incoming) 3103 are provided. Male connector 32 also has a thin case 320. The width of case 320 of male connector 32 is slightly narrower than the case 315 of female connector 31#, and the length is about a half that of case 315 of female connector 31#. Though not clear from the figure, at an end portion of case 315 of female connector 31#, there is an open space to receive the case 320 of male connector 32 by about one-half in the longitudinal direction, and deeper in the open space, a conductor terminal arrangement is provided. On the tip end of case 320 of male connector 32 also, a conductor terminal arrangement is provided, in a slightly projected manner. Specifically, the conductor terminal arrangement in female connector 31# and conductor terminal arrangement 331 of male connector 32 are electrically connected through cable portion 33#.

Figure 19:
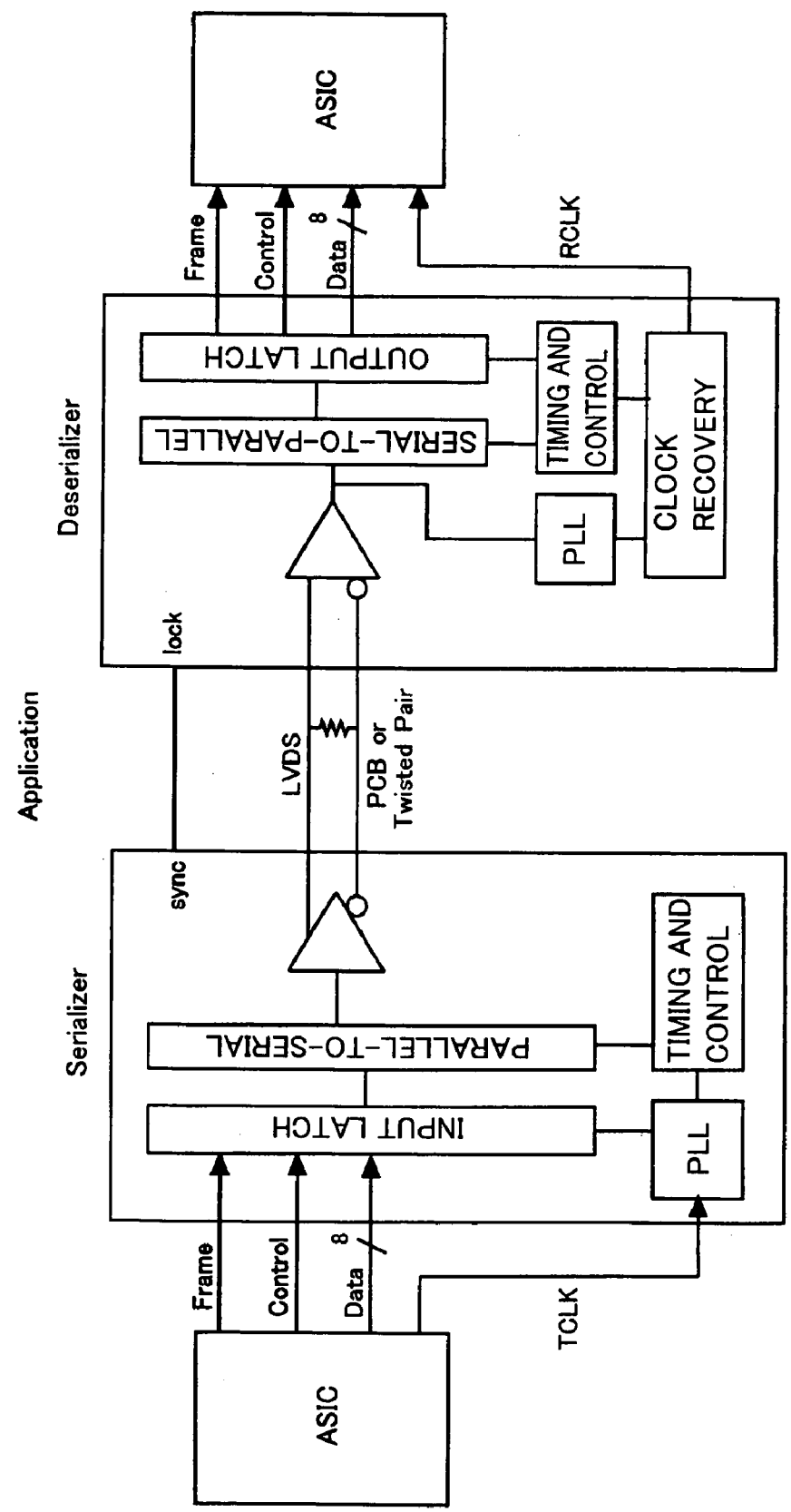
FIG. 19 shows a specific configuration of the waveform shaping portion employing the P/S converting portion and S/P converting portion in accordance with the second embodiment.

Next, description will be made with reference to FIG. 19, which is an exploded perspective view showing the internal structure of extension cable. As can be seen from the figure, case 315 of female connector 31# consists of an upper case 312 and a lower case 313. In an open space formed by the upper and lower cases 312 and 313, a circuit board 314 is placed, on which a waveform shaping circuit is mounted. At an end portion of circuit board 314, conductor terminal arrangement 311 is provided in a slightly projected manner. Specifically, conductor terminal arrangement 311 of female connector 31# and conductor terminal arrangement 331 of male connector 32 can be attached to and detached from each other. Here, by way of example, the "conductor terminal arrangement" refers to pins on one side and receptacles on the other side. More specifically, conductor terminal arrangement 311 in female connector 31# consists of twenty pins, from pin #1, pin #2, pin #3 . . . to pin #20. Similarly, conductor terminal arrangement 331 of male connector 32 consists of twenty receptacles, from first receptacle, second receptacle, third receptacle . . . to the twentieth receptacle. These pins and receptacles can be electrically connected as they can be attached to and detached from each other, and the open space formed on the front end of female connector 31# receives approximately half the male connector 32. Therefore, these are firmly fixed electrically and mechanically.

Figure 16:
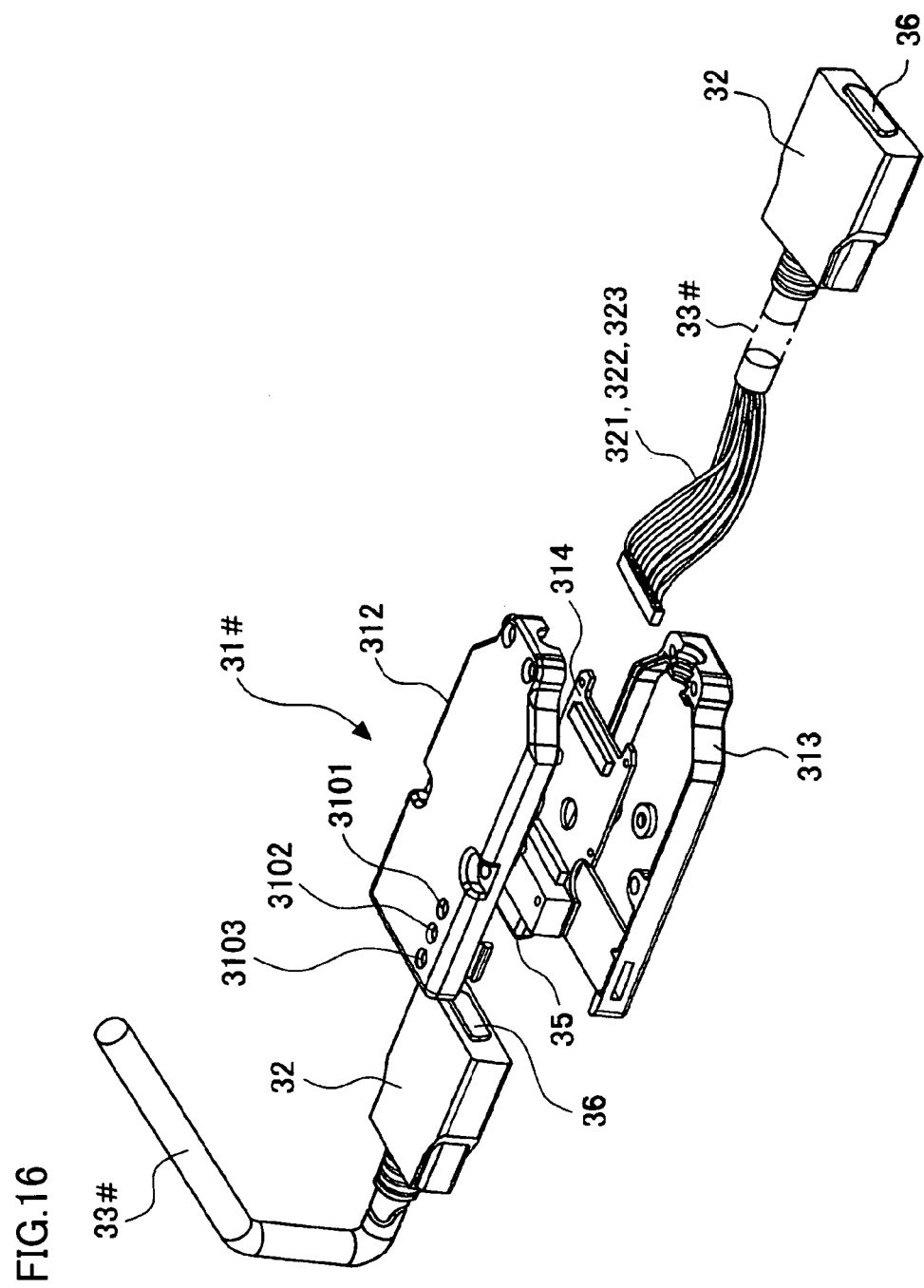
FIG. 16 is an exploded perspective view showing an internal structure of the extension cable in accordance with the second embodiment.

In FIG. 16, reference characters 321, 322 and 323 denote the first to third core lines made bare with the cover of cable portion 33# removed, and tip ends of the core lines are electrically connected to circuit board 314 through a board connector.

Next, referring to FIG. 17, the configuration of circuits mounted on the board will be described. In the figure, conductor terminal arrangement 311, cable portion 33# and circuit board 314 are connected. As is apparent from the figure, in the electric circuit mounted on the board, a first signal transmission path for transmitting data from signal processing portion 2 to sensor head portion 1, and a second signal transmission path for transmitting data from sensor head portion 1 to signal processing portion 2 are provided.

Specifically, the first signal transmission path includes a serial/parallel converting portion 3104 converting a serial signal coming in the form of a differential signal S31 from pin lines #5 and #6 in cable portion 33# to a 10-bit parallel signal, and a parallel/serial converting portion 3105 performing parallel/serial conversion on parallel signal S32 obtained from serial/parallel converting portion 3104 and outputting the resulting signal as a differential signal S33 to pins #5 and #6 of conductor terminal arrangement 311.

The second signal transmission path includes a serial/parallel converting portion 3106 converting a serial signal coming in the form of a differential signal S41 from pins #2 and #3 in cable portion 33# to a 10-bit parallel signal, and a parallel/serial converting portion 3107 performing parallel/serial conversion on the 10-bit parallel signal S42 and outputting the resulting signal as a differential signal S43 to pin lines #2 and #3 of cable portion 33#.

By the above-described configuration, it follows that the data serially transmitted from the signal processing portion to the sensor head portion have waveforms shaped by serial/parallel converting portion 3104 and parallel/serial converting portion 3105. Similarly, the data serially transmitted from the sensor head portion to the signal processing portion have waveforms shaped by serial/parallel converting portion 3106 and parallel/serial converting portion 3107. Therefore, even when a plurality of extension cables of the present invention are joined, waveform shaping function can be attained in each of the cables, and thus, waveform degradation or voltage drop is suppressed. Therefore, even when a plurality of cables are joined and elongated, necessary data can correctly be transmitted.

Figure 17:
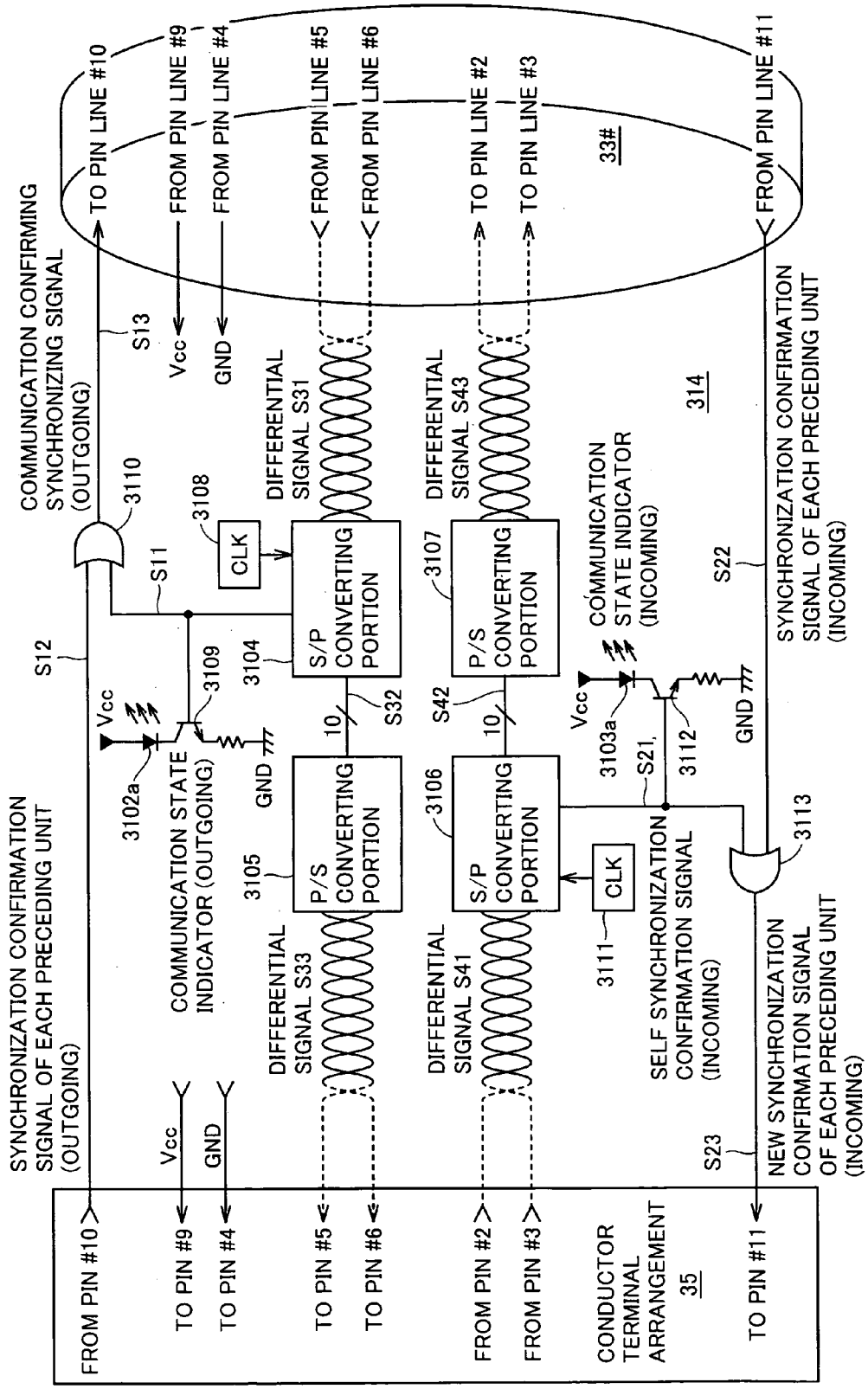
FIG. 17 shows a configuration of a circuitry mounted on a board in accordance with the second embodiment.

In FIG. 17, reference characters 3108 and 3111 denote clock oscillators. A power supply Vcc for operating electric circuits on the board is provided from pin line #9 of cable portion 33#, and the ground GND is provided from pin line #4, respectively. The power supply Vcc and the ground GND are output to pins #9 and #4 of conductor terminal arrangement 311.

The main portion of the present invention will be described next. As to the first transmission path, to pin #10 of conductor terminal arrangement 311, a synchronization confirmation signal (outgoing) S12 of each preceding unit arrives from the downstream side of the first transmission path. From serial/parallel converting portion 3104, a self synchronization confirmation signal (outgoing) S11 is output. The self synchronization confirmation signal (outgoing) S11 is a binary signal, adapted to assume "H" when synchronization is not established, and "L" when synchronization is established. The self synchronization confirmation signal (outgoing) S11 and synchronization confirmation signal (outgoing) S12 of each preceding unit are subjected to an OR operation in an OR circuit 3110, and the resulting new synchronization confirmation signal (outgoing) S13 of each preceding unit is output to pin line #10 of cable portion 33#.

As to the second transmission path, from pin line #11 of cable portion 33#, a synchronization confirmation signal (incoming) S22 of each preceding unit is provided. From serial/parallel converting portion 3106, a self synchronization confirmation signal (incoming) S21 is output. The self synchronization confirmation signal S21 is a binary signal, adapted to assume "H" when synchronization is not established, and "L" when synchronization is established. The self synchronization confirmation signal (incoming) S21 and synchronization confirmation signal (incoming) S22 of each preceding unit are subjected to an OR operation in an OR circuit 3113, and the resulting new synchronization confirmation signal (incoming) S23 of each preceding unit is output to pin #11 of conductor terminal arrangement 311. To the base of a transistor 3109 driving a light emitting diode 3102a forming a communication state indicator (outgoing) 3102, the self synchronization confirmation signal (outgoing) S11 described above is applied. Therefore, when the state of self synchronization confirmation signal (outgoing) S11 output from serial/parallel converting portion 3104 attains to "H" (synchronization is not established), transistor 3109 turns on, light emitting diode 3102a is driven, and communication state indicator (outgoing) 3102 is lit. Similarly, in the second transmission path, to the base of a transistor 3112 driving a light emitting diode 3103a forming a communication state indicator (incoming) 3103, the self synchronization confirmation signal (incoming) S21 described above is applied. Therefore, when the state of self synchronization confirmation signal (incoming) S21 attains to "L" (synchronization is not established), transistor 3112 turns on, light emitting diode 3103a is driven, and communication state indicator (incoming) 3103 is lit. In this manner, in the circuitry mounted on the board, along the first transmission path, an OR signal S13 between synchronization confirmation signal (outgoing) S12 of each preceding unit coming from the down stream of transmission side and the self synchronization confirmation signal (outgoing) S11 is transmitted successively to the upstream side along the direction of transmission. Therefore, when synchronization is lost in any of the cables in the downstream side and the self synchronization confirmation signal (outgoing) S11 thereof attains to "H", OR circuit 3110 of each cable handles this "H" with priority, and thus, when synchronization is lost in any of the cables, information thereof is immediately transmitted to the signal processing portion at the end of the upstream side. Consequently, signal processing portion 2 at the end of the upstream side can immediately take an appropriate step necessary to re-establish synchronization. Similarly, along the second transmission path, synchronization confirmation signal (incoming) S22 of each preceding unit from the downstream side and self synchronization confirmation signal (incoming) S21 pass through OR circuit 3113 and successively transmitted to the upstream side as a new synchronization confirmation signal (incoming) S23 of each preceding unit. Therefore, when synchronization is lost in any of the cables in the downstream side, information thereof is immediately passed through OR circuit 3113 in each cable with priority, and transmitted to sensor head portion at the end of the upstream side. Thus, sensor head portion 1 can immediately take an appropriate step necessary to re-establish synchronization.

Referring to FIG. 20, a general flow chart of transmission/reception process executed by the sensor head portion and the signal processing portion will be described. Further, referring to FIGS. 21A to 21C, a flow chart of a main portion of the transmission/reception process will be described.

As shown in FIG. 20, when data is to be transmitted from the sensor head portion to the signal processing portion or from the signal processing portion to the sensor head portion, the sensor head portion or the signal processing portion executes data transmitting process (step 1101) and data receiving process (step 1105), while presence/absence of any communication error is determined (step 1103) based on the state of synchronization confirmation signal (outgoing) S13 of each preceding unit or synchronization confirmation signal (incoming) S23 of each preceding unit, by data reception process (step S1102).

Figure 21C:
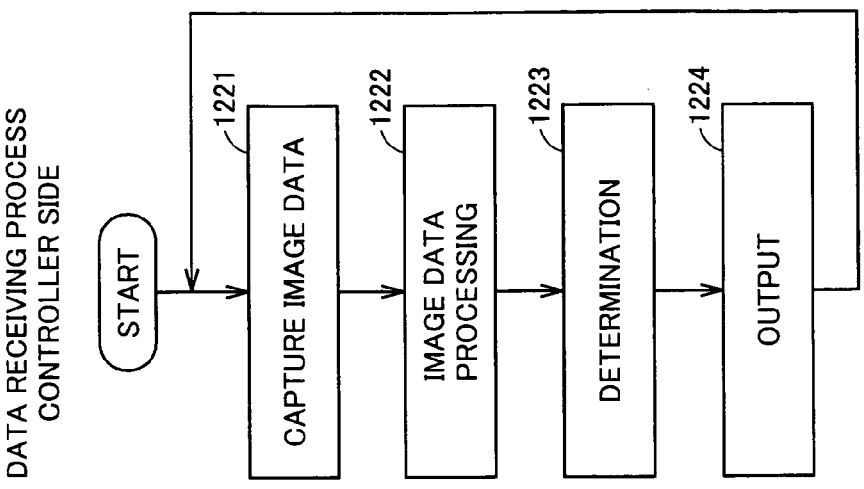
FIGS. 21A to 21C are flow charts showing a main portion of the transmitting and receiving process in accordance with the second embodiment.
Figure 21B:
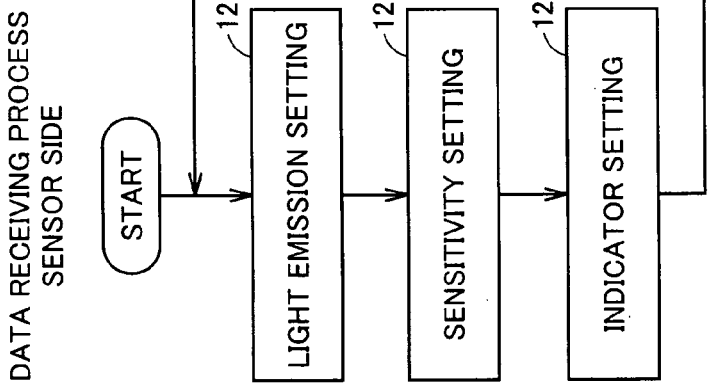
Figure 21A:
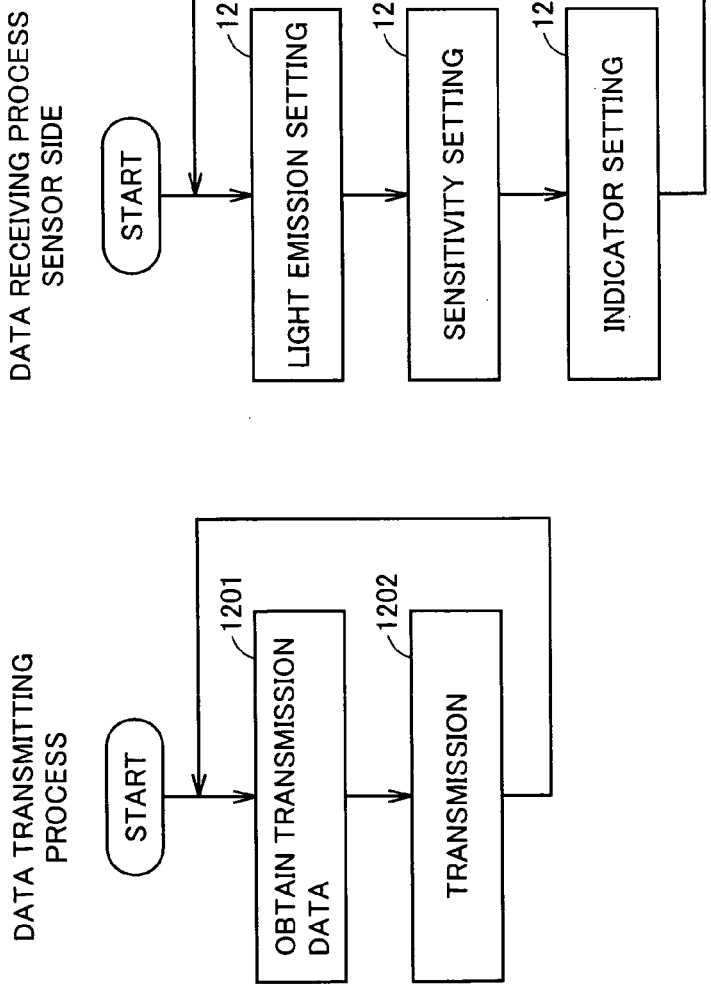

Details of data transmitting process (step 1101) and data receiving process (step 1105) are shown in FIGS. 21A to 21C. Specifically, as shown in FIG. 21A, in the data transmitting process, either the sensor head portion or the signal processing portion repeats the steps of obtaining necessary transmission data (step 1201), and transmitting the same (step 1202). As to the data receiving process, the process on the sensor side is as shown in FIG. 21B. Specifically, based on the received data, various steps necessary for the operation of the sensor head portion including light emission setting process (step 1211), sensitivity setting process (step 1212), indicator setting process (step 1213) are executed repeatedly. The data receiving process on the controller side is as shown in FIG. 21C. Specifically, image data capturing process (step 1221), image data processing (step 1222), determining process (step 1223) and output process (step 1224) are repeated, while various operations necessary for the operation of displacement sensor and the output operation are performed.

Returning to FIG. 20, when it is determined during communication error determination described above that there is a communication error (YES in step 1103), the sensor head portion or the information processing portion as the transmitting end executes a data hold process (step 1104). Data hold process refers to a process of holding back the data transmission. The data hold process is continued until the state of synchronization confirmation signal (outgoing) S13 of each preceding unit or synchronization confirmation signal (incoming) S23 of each preceding unit changes to represent absence of any communication error (NO in step 1103).

When the data hold process (step 1104) is executed by the sensor head portion or signal processing portion as the transmitting end and data transmission stops, serial/parallel converting portion 3104 in the extension cable positioned on the succeeding stage automatically starts transmission of a synchronization pattern to re-establish synchronization, on condition that transmission data is disrupted. The synchronization pattern is converted to serial data by parallel/serial converting portion 3105, and transmitted to the extension cable of the next stage through pins #5 and #6 of conductor terminal arrangement 311. Then, similar operation for re-establishing synchronization is executed by the extension cable of the next stage, and thereafter, in each of the extension cables of the succeeding stages, synchronization is re-established automatically. Then, synchronization is established in the extension cable of the last stage, self synchronization confirmation signal (outgoing) S11 returns from "H" to "L", and at signal processing portion 2 positioned at the transmitting end, it is determined that there is no communication error (NO in step 1103). Thereafter, normal data transmitting and data receiving operations are resumed.

Similarly, in the second transmission path, serial/parallel converting portion 3106 in the transmission cable positioned on the succeeding stage automatically starts transmission of a synchronization pattern to re-establish synchronization, on condition that transmission data is disrupted by the data hold process (step 1104). The synchronization pattern is converted to serial data by parallel/serial converting portion 3107, and transmitted to pin lines #2 and #3 in cable portion 33#. Then, similar operation for re-establishing synchronization is executed by the extension cable of the next stage, and after self synchronization confirmation signal (incoming) S21 returns from "H" to "L" in serial/parallel converting portion 3106 in the extension cable positioned on the last stage, at the sensor head portion 1 positioned at the transmitting end, it is determined that there is no communication error (NO in step 1103). Thereafter, data transmission from the sensor head portion to the signal processing portion resumes.

The operations of serial/parallel converting portion 3104 and parallel/serial converting portion 3105 of the first transmission path and serial/parallel converting portion 3106 and parallel/serial converting portion 3107 of the second transmission path can readily be realized by using commercially available communication ICs.

Figure 18B:
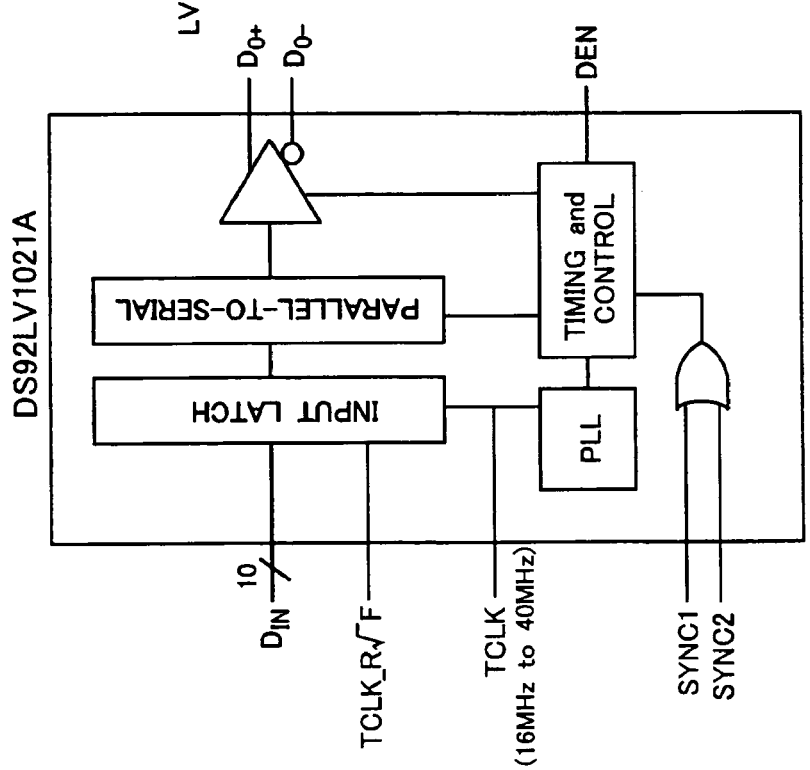
FIGS. 18A and 18B represent specific examples of IC configuration of the P/S converting portion and S/P converting portion in accordance with the second embodiment.
Figure 18A:
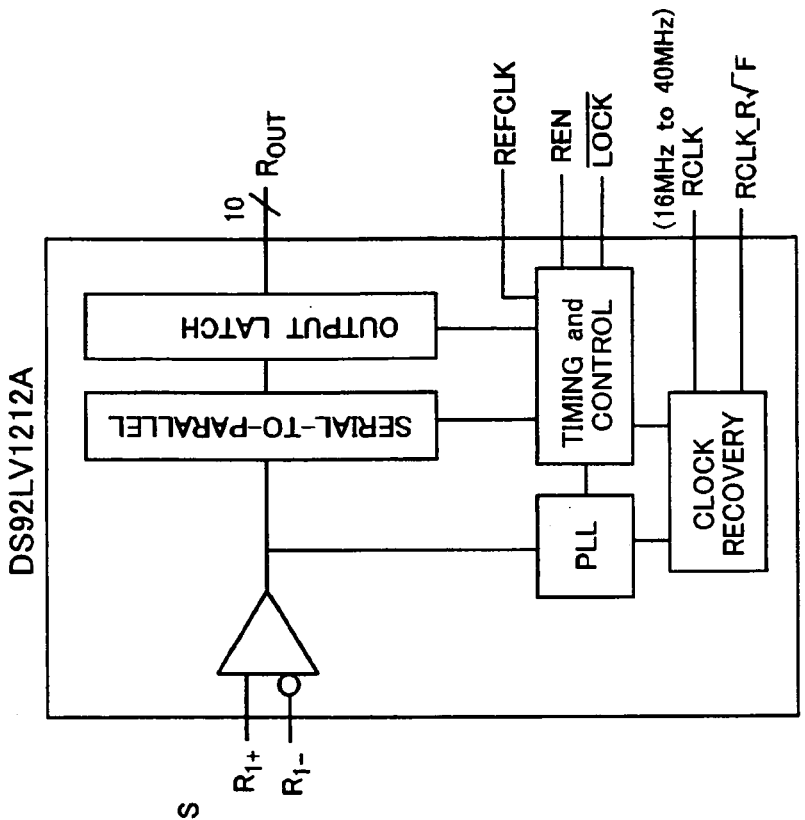

FIGS. 18A and 18B show examples of specific ICs for implementing the parallel/serial converting portion (P/S converting portion) and the serial/parallel converting portion (S/P converting portion). FIG. 19 shows a specific example of the waveform shaping portion using the P/S converting portion and S/P converting portion. In this example, a 16–40 MHz, 10-bit BusLVDS serializer (type DS92LV1021A) and a deserializer (type DS92LV1212A) manufactured by National Semiconductor Corporation are used as the P/S converting portion and S/P converting portion, respectively.

As shown in FIG. 18B, to the inverted LOCK terminal of the IC (DS92LV1212A), "H" is output when synchronization is not established, and "L" is output when synchronization is established. Therefore, the binary signal obtained at the inverted LOCK terminal can be used as the self synchronization confirmation signal. Further, in the IC (DS92LV1021A), by fixing a terminal SYNC1 or 2 to "L", an operation of transmitting a synchronization pattern for re-establishing synchronization can automatically be started when the parallel data to be obtained at the input side is lost. Therefore, the present invention can readily be implemented by using, by way of example, these ICs.

In the embodiments above, OR circuits 3110 and 3113 are provided to perform an OR operation between the synchronization confirmation signal of each preceding unit and the self synchronization confirmation signal to generate a new synchronization confirmation signal of each preceding unit. The OR circuits, however, may be omitted, and pins #10 and #11 of the conductor terminal arrangement may be coupled to pin lines #10 and #11 of the cable portion to form a bypass, by which similar effects can be attained.

Figure 22:
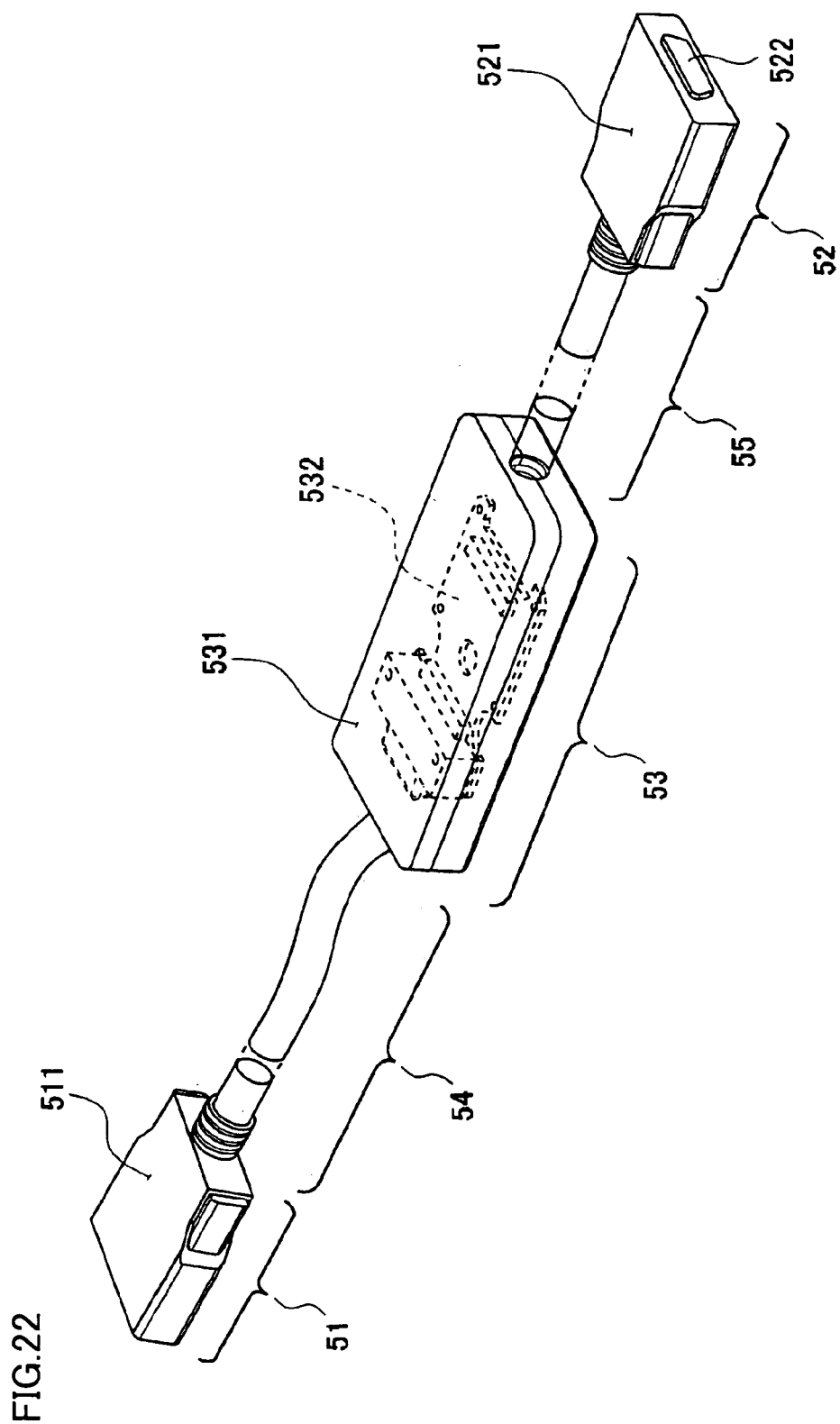
FIG. 22 shows a modification of the second embodiment of the present invention.

Next, referring to FIG. 22, a modification of the second embodiment of the present invention will be described. In this example, an attachment 53 is interposed between female connector 51 and male connector 53. A case 511 of female connector 51 and a case 531 of attachment 53 are connected by a cable portion 54. Similarly, case 521 of male connector 52 and case 531 of attachment 53 are connected by a cable portion 55. A circuit board 532 is contained in case 531 of attachment 53. On circuit board 532, electric circuitry described with reference to FIG. 17 above is mounted. In the figure, reference character 522 represents a conductor terminal arrangement of the male connector. In this manner, the electric circuitry including the waveform shaping circuit shown in FIG. 17, which is the main portion of the present invention, may be provided not in the female or male connector but in attachment 53 positioned therebetween.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sensor cable to be used joined one after another for electrically connecting a sensor head portion and a signal processing portion of a separated type sensor, having:

a first connector half holding a conductor terminal arrangement;

a second connector half holding a conductor terminal arrangement; and an electric cord of a prescribed length for electrically connecting the conductor terminal arrangement of the first connector half to the conductor terminal arrangement of the second connector half; wherein the electric cord includes at least one of a first twisted pair of strand used for transmission from the signal processing portion to the sensor head portion and a second twisted pair of strand used for transmission from the sensor head portion to the signal processing portion;

the first connector half, the second connector half or an attachment added in the middle of the electric cord includes an electric circuit having a waveform shaping function;

the electric circuit contains a serial/parallel converter converting a serial signal coming in the form of a differential signal through specific two conductor terminals of the conductor terminal arrangement to a parallel signal, and a parallel/serial converter converting the parallel signal obtained from the serial/parallel converter to a serial signal, and outputting the serial signal in the form of a differential signal to specific two twisted pair of strands of the electric cord;

the serial/parallel converter externally outputs a binary self synchronization confirmation signal, said self synchronization confirmation signal being adapted to assume "1" when synchronization is not established and "0" when synchronization is established, while the parallel/serial converter is adapted to start a parallel/serial converting operation upon arrival of a parallel signal to an input side;

the electric circuit additionally includes an OR circuit providing a signal corresponding to an OR of a synchronization confirmation signal of each preceding unit arriving through a specific one conductor terminal of the conductor terminal arrangement and the self synchronization confirmation signal output from the serial/parallel converter as a new synchronization confirmation signal of each preceding unit to a specific one signal strand of the electric cord; whereby if synchronization is lost in any of the plurality of cables joined and coupled to each other, the signal processing portion or the sensor head portion as a transmitting side apparatus is notified of the loss, through one signal strand.

2. A sensor cable to be used joined one after another for electrically connecting a sensor head portion and a signal processing portion of a separated type sensor, having:

a first connector half holding a conductor terminal arrangement;

a second connector half holding a conductor terminal arrangement; and an electric cord of a prescribed length for electrically connecting the conductor terminal arrangement of the first connector half to the conductor terminal arrangement of the second connector half; wherein the electric cord includes a first twisted pair of strand used for transmission from the signal processing portion to the sensor head portion and/or a second twisted pair of strand used for transmission from the sensor head portion to the signal processing portion;

the first connector half, the second connector half or an attachment added in the middle of the electric cord includes an electric circuit having a waveform shaping function;

the electric circuit contains a serial/parallel converter converting a serial signal coming in the form of a differential signal through specific two conductor terminals of the conductor terminal arrangement to a parallel signal, and a parallel/serial converter converting the parallel signal obtained from the serial/parallel converter to a serial signal, and outputting the serial signal in the form of a differential signal to specific two twisted pair of strands of the electric cord;

the electric circuit additionally includes a bypass outputting a last stage synchronization confirmation signal arriving through a specific one conductor terminal of the conductor terminal arrangement directly to a specific one signal strand of the electric cord; whereby if synchronization is lost in any of the plurality of cables joined and coupled to each other, the signal processing portion or the sensor head portion as a transmitting side apparatus is notified of the loss, through one signal strand.

3. The sensor cable according to claim 2, wherein the first connector half, the second connector half or an attachment added in the middle of the electric cord includes a communication state indicator driven by a self synchronization confirmation signal output from the serial/parallel converter.

4. An amplifier-separated type sensor, comprising:

a sensor head portion;

a signal processing portion; and a sensor extension cable, wherein said sensor extension cable includes a first connector half holding a conductor terminal, a second connector half holding a conductor terminal, an electric cord electrically connecting the conductor terminal of said first connector half to the conductor terminal of said second connector half, and a waveform shaping circuit performing waveform shaping on a signal passed through said electric cord, said electric cord includes a power-source line for supplying a power-source power from said signal processing portion to said sensor head portion, a power supply line that branches from said power-source line to supply a driving power to said waveform shaping circuit, a first twisted pair communication line for transmitting a sensing signal output from said sensor head portion to said signal processing portion, and a second twisted pair communication line for transmitting a control signal output from said signal processing portion to said sensor head portion, said waveform shaping circuit is formed by using a serializer and a deserializer and is supplied with said driving power through said power supply line, said sensor head portion has a third connector half holding a conductor terminal, through the conductor terminal of said third connector half, said sensing signal that is a high speed differential transmission signal is output, said control signal is input, and the power-source power is input to be supplied to said sensor head portion, said signal processing portion includes a fourth connector half holding a conductor terminal, through the conductor terminal of said fourth connector half, said sensing signal that is the high speed differential transmission signal is input, said control signal is output, and said power-source power is output to be supplied from said signal processing portion, and a set of said first connector half and said second connector half; a set of said first connector half and said fourth connector half, a set of said second connector half and said third connector half, and a set of said third connector half and said fourth connector half each have such structures that allow the connector halves to be attached to and detached from each other.

5. The amplifier-separated type sensor according to claim 4, wherein said sensor head portion is a sensor head portion of a displacement sensor or a visual sensor, including a two-dimensional image pick-up device.

6. The amplifier-separated type sensor according to claim 4, wherein said control signal is a high speed differential transmission signal.

7. The amplifier-separated type sensor according to claim 4, wherein said waveform shaping circuit is provided in the middle of said electric cord.

8. The amplifier-separated type sensor according to claim 4, wherein said waveform shaping circuit is contained in said first or second connector half.

9. The amplifier-separated type sensor according to claim 4, wherein said first and second connector halves respectively holding the conductor terminals have body cases adapted to allow coupling of the connector halves with each other in a fixed state.

10. A sensor extension cable for connecting a sensor head portion and a signal processing portion of an amplifier-separated type sensor, said sensor extension cable comprising:
- a first connector half holding a conductor terminal;
- a second connector half holding a conductor terminal;
- an electric cord electrically connecting the conductor terminal of said first connector half to the conductor terminal of said second connector half; and
- a waveform shaping circuit performing waveform shaping on a signal passed through said electric cord, wherein
- said electric cord includes
- a power-source line for supplying a power-source power from said signal processing portion to said sensor head portion,
- a power supply line that branches from said power-source line to supply a driving power to said waveform shaping circuit,
- a first twisted pair communication line for transmitting a sensing signal output from said sensor head portion to said signal processing portion, and
- a second twisted pair communication line for transmitting a control signal output from said signal processing portion to said sensor head portion,
- said waveform shaping circuit is formed by using a serializer and a deserializer and is supplied with said driving power through said power supply line,
- said sensor head portion has a third connector half holding a conductor terminal,
- through the conductor terminal of said third connector half, said sensing signal that is a high speed differential transmission signal is output, said control signal is input, and the power-source power is input to be supplied to said sensor head portion,
- said signal processing portion includes a fourth connector half holding a conductor terminal,
- through the conductor terminal of said fourth connector half, said sensing signal that is the high speed differential transmission signal is input, said control signal is output, and said power-source power is output to be supplied from said signal processing portion, and
- a set of said first connector half and said second connector half a set of said first connector half and said fourth connector half, a set of said second connector half and said third connector half, and a set of said third connector half and said fourth connector half each have such structures that allow the connector halves to be attached to and detached from each other.

* * * * *